(12) United States Patent
Koide et al.

(10) Patent No.: US 6,870,566 B1
(45) Date of Patent: Mar. 22, 2005

(54) IMAGE SENSING SYSTEM FOR SENSING AN IMAGE AND CONVERTING THE IMAGE INTO IMAGE SIGNALS WITH A CONTROLLED OPERATING RATE

(75) Inventors: Yuji Koide, Yokohama (JP); Kenichi Kondo, Kawasaki (JP); Nobuo Fukushima, Yokohama (JP); Masayoshi Sekine, Tokyo (JP); Koichi Sono, Hiratsuka (JP); Gaku Watanabe, Tokyo (JP)

(73) Assignee: Canon Kabushiki Kaisha (JP)

( * ) Notice: Subject to any disclaimer, the term of this patent is extended or adjusted under 35 U.S.C. 154(b) by 932 days.

(21) Appl. No.: 08/756,132

(22) Filed: Nov. 26, 1996

(30) Foreign Application Priority Data

| Dec. 7, 1995 | (JP) | 7-319165 |
| Dec. 7, 1995 | (JP) | 7-319166 |
| Dec. 7, 1995 | (JP) | 7-319168 |

(51) Int. Cl.$^7$ .......................... H04N 3/14; H04N 5/238
(52) U.S. Cl. .................... 348/296; 348/224.1; 348/234; 348/312; 348/364; 348/552
(58) Field of Search .................... 348/207.99, 222.1, 348/229.1, 231.1, 231.3, 231.7, 296–298, 312, 360–364, 552, 234, 235, 236, 237; 358/906, 909.1; H04N 3/14, 5/238, 9/73

(56) References Cited

U.S. PATENT DOCUMENTS

| 3,962,725 | A | * | 6/1976 | Lemke et al. ................ 358/906 |
| 4,598,322 | A | | 7/1986 | Atheterton |
| 5,067,029 | A | * | 11/1991 | Takahashi .................... 348/233 |
| 5,155,597 | A | | 10/1992 | Lareau et al. ................ 348/311 |
| 5,206,730 | A | | 4/1993 | Sakai .......................... 348/220 |
| 5,402,170 | A | | 3/1995 | Parulski et al. ............. 348/211 |
| 5,517,331 | A | | 5/1996 | Murai et al. ................. 358/486 |
| 5,532,844 | A | * | 7/1996 | Kagami ....................... 358/468 |
| 5,563,655 | A | * | 10/1996 | Lathrop ....................... 348/231 |
| 5,585,856 | A | * | 12/1996 | Nakaya ....................... 348/441 |
| 5,608,490 | A | * | 3/1997 | Ogawa ........................ 396/300 |
| 5,633,976 | A | * | 5/1997 | Ogino .......................... 348/231 |
| 5,666,159 | A | * | 9/1997 | Parulski ....................... 348/211 |
| 5,754,227 | A | * | 5/1998 | Fukuoka ...................... 348/232 |
| 5,777,755 | A | * | 7/1998 | Aoki ........................... 358/444 |
| 5,790,274 | A | * | 8/1998 | Aizawa ....................... 348/552 |
| 5,821,996 | A | * | 10/1998 | Kawamura .................. 348/232 |
| 5,852,467 | A | * | 12/1998 | Ogino .......................... 348/231 |
| 5,978,020 | A | * | 11/1999 | Watanabe et al. ...... 348/207.99 |
| 6,032,864 | A | * | 3/2000 | Hamasuna ................... 358/448 |
| 6,642,958 | B2 | * | 11/2003 | Watanabe et al. ........... 348/552 |

FOREIGN PATENT DOCUMENTS

| EP | 0 336 317 A2 | 3/1989 | ............ H04N/1/21 |
| EP | 0 659 017 A2 | 12/1994 | .......... H04N/5/232 |
| EP | 96308595.6-2202 | 2/1998 | |
| JP | 1-264062 A | 10/1989 | ............ H04N/1/17 |
| JP | 2-294158 | 12/1990 | |
| JP | 04170881 | 6/1992 | ............ H04N/7/00 |
| JP | 6-014159 | 1/1994 | |
| JP | 6-176114 | 6/1994 | |
| JP | 07184093 | 7/1995 | .......... H04N/5/225 |

* cited by examiner

*Primary Examiner*—Wendy R. Garber
*Assistant Examiner*—Jason Whipkey
(74) *Attorney, Agent, or Firm*—Morgan & Finnegan, LLP

(57) ABSTRACT

In an image sensing apparatus using an image sensing device, such as a CCD, to be used by connecting to an external device, such as a computer, an operating rate of the CCD is changed in accordance with a rate at which the computer receives image signals from the image sensing apparatus. Further, when the operating rate of the CCD is changed, a proper exposure value is conjectured to obtain an image sensed at a proper exposure on the basis of operating rates of the CCD before and after the operating rate is changed, and a proper exposure value of the CCD before the operating rate is changed.

32 Claims, 16 Drawing Sheets

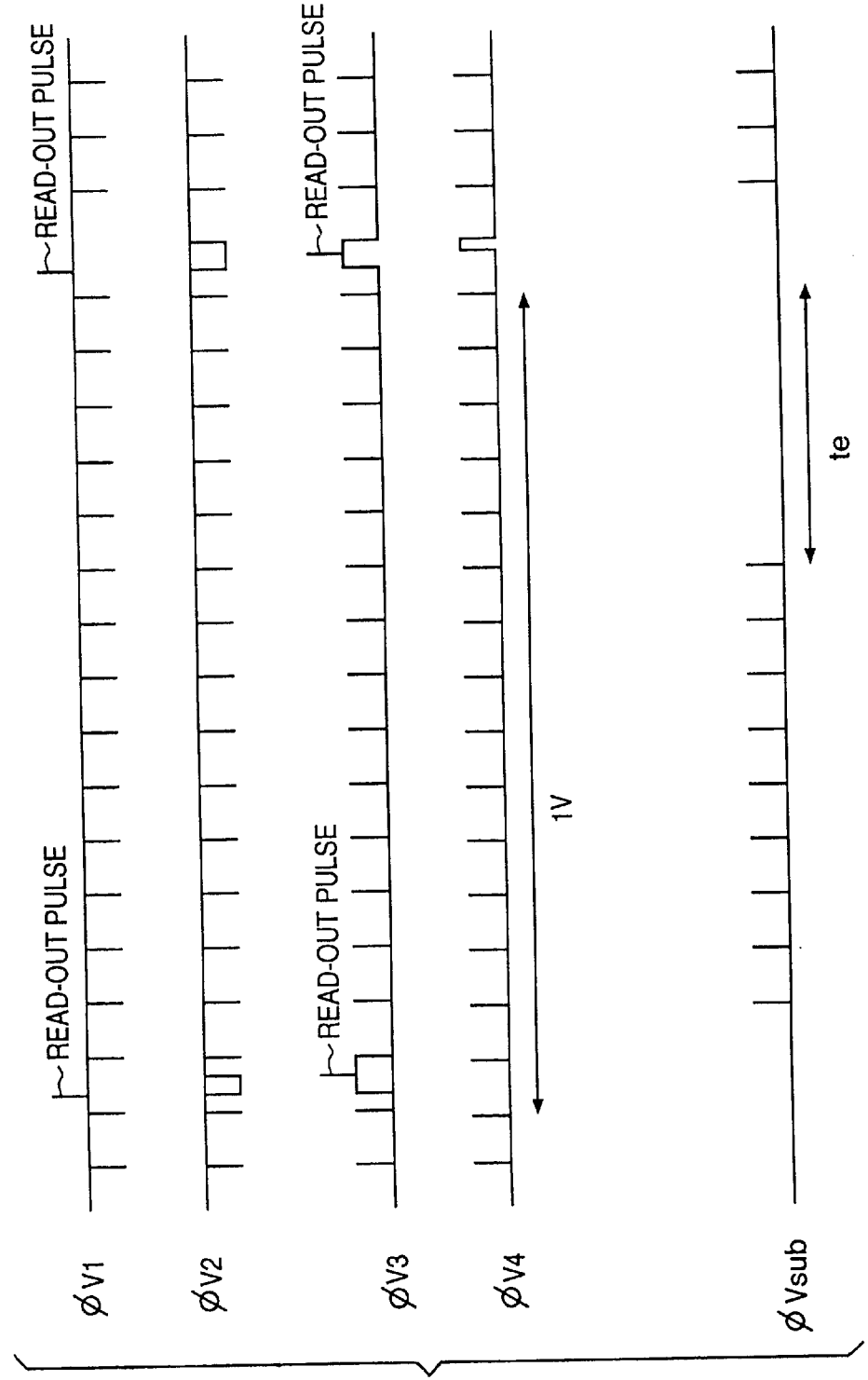

IMAGE SENSING SYSTEM FOR SENSING AN IMAGE AND CONVERTING THE IMAGE INTO IMAGE SIGNALS WITH A CONTROLLED OPERATING RATE

BACKGROUND OF THE INVENTION

The present invention relates to an image sensing apparatus used with a computer and an image sensing system comprising an image sensing unit and a computer.

When a computer has a connector of the Personal Computer Memory Card International Association (PCMCIA) standard, it is common to use the computer with many kinds of card units, also having a PCMCIA standard connector, of a variety of functions, such as a facsimile card and a memory card, by connecting them to the computer. In other words, it is possible to use a card having a PCMCIA standard connector by connecting it to many kinds of computers having connectors of the PCMCIA standard.

Since it is possible to transmit data at high rate through connectors of the PCMCIA standard, it is effective to use them as an input means to a computer to input an image which is generally represented by a large amount of data.

FIG. 10 is an overall view of a conventional image sensing system consisting of an image sensing unit, having a PCMCIA standard connector, for sensing an image by using an image sensing device, such as a CCD, and a computer having a connector of the same type.

In FIG. 10, reference numeral 51 denotes an image sensing unit having a PCMCIA standard connector; 52 and 53, computers; 54 and 55, connectors of the PCMCIA standard on the computers 52 and 53, respectively; and 56 and 57, display devices, such as liquid crystal displays, of the computers 52 and 53, respectively.

An operation of the image sensing system having the aforesaid configuration is as below.

When the image sensing unit 51 is connected to the computer 52, a user designates to perform image sensing operation from the computer 52, and the image sensing operation starts by using a lens unit and a CCD in the image sensing unit 51. At this point, an image is represented by charges stored in the CCD.

In the image sensing unit 51, the sensed image (i.e., stored charges) is read from the CCD by pixel, then sequentially converted into digital data. The computer 52 receives the converted digital image data through the connector 54 as the image is converted into the digital image data. The digital image data is stored in a memory of the computer 52.

In a case where the image sensing unit 51 is connected to the computer 53, the computer 53 can receive image data in the same manner.

According to the aforesaid image sensing system, in the image sensing unit, it is necessary to read charges stored in the CCD and convert them into digital data in the possible shortest period of time in order to obtain an image of good quality.

However, the rate at which a computer can receive digital data through connectors differs from computer to computer.

Thus, if the rate to read charges from a CCD (i.e., image sensing rate) is set to a fixed value, the following inconvenience might occur, for example. Assume that the rate at which the computer 52 can receive image data is higher than the rate at which the computer 53 can receive. In this case, there is a possibility that the computer 52 can receive all the image data from the image sensing unit 51 when the image sensing unit 51 is connected to the computer 52, but the computer 53 may not be able to receive all the image data from the image sensing unit 51 when the image sensing unit 51 is connected to the computer 53.

Further, there would be the following case. Namely, although an image sensing rate is set to the rate at which a computer can receive all the image data when the computer is operated under a normal state, the computer ay occasionally miss some image data because of interruption by other processes during receiving the image data.

Accordingly, it has been necessary to set the image sensing rate much lower than the rate at which a computer can receive image data so as to prevent the computer from missing any image data in the conventional image sensing system. However, the low image sensing rate causes a drop of image quality because of greater movement of an object to be sensed during sensing it and an increase of dark current noises.

Further, it is possible to store a still image by storing image data in memories of the computers 52 and 53. Furthermore, it is also possible to use the display devices 56 and 57 of the computers 52 and 53 as finders by displaying the image received by the image sensing unit 51 on the display units 56 and 57 at real time. In this case, a user can confirm a composition of an image to be sensed and the size of an object in the image on the finder, thereby sensing a desired still image by designating to perform image sensing operation with a keyboard and a mouse of the computer when the user find a desired image on the finder.

Now, since the resolution of a liquid crystal display of a computer is generally low, the number of reproducible color of the display is often limited. Further, in order to use the displays of the computers 52 and 53 in FIG. 10 as finders, the amount of image data received by the computer 52 or 53 from the image sensing unit 51 is preferably small, although the resolution drops.

On the contrary, in a case of sensing a still image by the image sensing system shown in FIG. 10, since there is a possibility that the sensed still image will be displayed on a high-resolution display, it is preferred to sense the still image in as a high resolution as possible.

Therefore, in a case of sensing a still image by the image sensing system shown in FIG. 10, the computer 52 or 53 receives image signals sensed in a higher resolution than a resolution for displaying the image on a finder from the image sensing unit 51. For example, if the liquid crystal displays 56 and 57 are in a 256 color palette mode, image data required for displaying an image on such the displays is 8 bits per pixel. In contrast, in order to sense a full-color still image, the required image data is 16 bits per pixel, or 24 bits per pixel.

The amount of data which the computers 52 and 53 can receive through the connectors 54 and 55 in a unit time period is constant, therefore, in a case of sensing a still image, the clock speed for a timing generator which controls timing for storing image data in a memory has to be decreased so that the rate of the computers 52 and 53 for receiving t he image data from the memory is equal to or higher than the rate for storing the image data into the memory to prevent the image data from overflowing from the memory of the image sensing unit 51.

In other words, in order to fix the data amount which the computer receives from the image sensing unit through the connector in a unit time period, upon sensing a still image, clock frequency for the timing generator for controlling the CCD has to be halved or decreased to a one-third of the rate at which an image is displayed on the finder.

Further, in the aforesaid image sensing system, while sequentially displaying an image on the display device 56 or 57, an automatic exposure controller calculates and sets how long (i.e., for how many clocks) the CCD is to be exposed (the number of clocks is referred as "electronic shutter value", hereinafter) on the basis of data on exposure so that the image is obtained at a proper exposure.

If the user designates to perform still image sensing operation when the user finds a desired image on the display device, since the clock frequency for the timing generator is decreased for sensing a still image, the still image would be over exposed with the same electronic shutter value as that for displaying the image on the finder.

The present invention is addressed to solve the aforesaid problems.

Furthermore, since the image sensing device used in the aforesaid image sensing unit by connecting to a computer is not limited by a video signal format, it can be designed freely. However, since it is easier to obtain a conventional image sensing device as well as it is possible to manufacture the image sensing unit at low cost by using a conventional image sensing device, an image sensing device designed for a video camera is often used.

Further, as an integrated circuit (IC) for a timing generator for operating the image sensing device, an IC for video camera is used. In addition, ICs for correlated double sampling, automatic gain control, signal processing, and a synchronizing signal generator used in the image sensing unit are also used in a video camera. Consequently, an image sensing unit (a camera) including above parts are operated at the video rate.

FIG. 11 is a block diagram illustrating a configuration of a conventional image sensing unit (digital camera). In FIG. 11, reference numeral 1 denotes an optical lens for forming an image of the object; 2, an iris diaphragm for controlling a quantity of incoming light of the optical image of the object passing through the optical lens 1; 3, an image sensing device for converting the image of the object formed by the optical lens 1 into electric signals, and as the image sensing device, an interlace scanning type CCD, commonly used in a movie video device, having a color filter in which complementary colors are repeatedly arranged in a fixed pattern is used.

Further, reference numeral 4 is a timing signal generator (TG) for generating timing signals necessary for operating the image sensing device 3; 5, an image sensing device operating unit for amplifying the timing signals from the TG 4 to a level with which the image sensing device 3 can be operated; 6, a correlated double sampling (CDS) circuit for removing output noises of the image sensing device 3; 7, an amplifier for amplifying output signals from the CDS circuit 6; and 8, a clumping circuit for stabilizing the zero (black) level of the amplified signal.

Reference numeral 9 denotes an analog-digital (A/D) converter for converting analog signals outputted from the clumping circuit 8 into digital signals; 10, an image signal processing circuit for processing the digitized signals; 18, a synchronizing signal generator (SSG) for generating pulses necessary for signal processes or generating synchronizing signals for dealing with video signals; 19, an interface (I/F) for outputting the signals processed by the image signal processing circuit 10 to a computer or a recording medium; 13, a luminance level detector for outputting information on an integrated value of luminance signals, generated by the image signal processing circuit 10, in a predetermined area; 14, a system controller for controlling entire processing of the camera; 15, an oscillator for generating a base clock to be reference of the entire processing; and 16, an iris diaphragm driver for driving the iris diaphragm 2 to change the aperture.

Control of luminous exposure in the camera having the configuration as above will be explained.

The control of the luminous exposure is, for example, to control the quantity of light which incidents on the image sensing device 3 by controlling the aperture of the iris diaphragm 2, thereby stabilizing the illuminance on the photosensing surface of the image sensing device. The quantity of light incidenting on the image sensing device 3 can be represented by an integrated value of luminance signals, obtained by the image signal processing circuit 10, based on the output signals in a predetermined area of the photosensing surface of the image sensing device 3. Then, the luminance level detector 13 gives the information on the luminance level to the system controller 14.

The system controller 14 compares the obtained luminance level to a reference luminance level, and if the obtained luminance level is higher than the reference luminance level, it controls the iris diaphragm 2 by instructing the iris diaphragm driver 16 to decrease the aperture of the iris diaphragm 2. Contrarily, if the obtained luminance level is lower than the reference luminance level, then it controls the iris diaphragm 3 by instructing the iris diaphragm driver 16 to increase the aperture of the iris diaphragm 3.

By performing the aforesaid feed-back operation, the luminous exposure is kept at a suitable value. Note that the iris diaphragm 2 commonly includes an IG meter having a coil and a magnet, and a stepping motor. Further, in a case where the enough quantity of light can not be obtained even if the iris diaphragm 2 is opened to its maximum, gain set in the amplifier 7 is increased.

A trend of a digital camera is to lower the price and the energy consumption. As such cameras, there are a digital camera having no iris diaphragm and a digital camera having a plurality of fixed iris diaphragm which can be manually switched. Luminous exposure in these cameras is controlled by controlling electronic shutters of image sensing devices, in other words, by controlling periods for storing charge in the image sensing devices. A method of controlling an electronic shutter will be explained below.

FIG. 12 shows a brief configuration of a general interlace scanning type CCD for a video camera. In FIG. 12, reference numeral 20 denotes photoelectric converters for converting incoming light whose wavelength is in a specific wavelength range into charges, and each photoelectric converter include a photodiode. Reference numeral 21 denotes vertical charge coupled devices (VCCDs) for transferring charges stored in each pixel in the vertical direction; 22, horizontal charge coupled device (HCCD) for transferring charges transferred via the VCCDs 21 by horizontal line; and 23, a floating diffusion amplifier for converting the charges transferred via the HCCD 23 into voltage signals and outputting them.

FIGS. 13A and 13B shows the detail of a pixel. Specifically, FIG. 13A shows a cross sectional view of a pixel, and FIG. 13B shows its potential profile.

As shown in FIGS. 13A and 13B, an anti-blooming structure and, as a function of an electronic shutter, a vertical over-flow drain is adopted. Further, the potential of the substrate is adjusted to a potential, Vsub (DC), at which an anti-blooming function properly works at a predetermined saturation charge. In addition, when a pulse of ΔVsub is applied, signal charges stored in the photodiodes are drained.

FIG. 14 is a timing chart of vertical transfer pulses ΦV1~ΦV4 for governing timing in a period of time between just before transference of charges from the photodiodes to the VCCDs and just after the next transference of charges from the photodiodes to the VCCDs, and an electronic shutter pulse ΦVsub. The electronic shutter pulses are usually applied during the horizontal return period.

The charge storage period "te" (exposure time or shutter speed) is a period between when the last electronic shutter pulse is applied between two charge transfer pulses for transferring charges from the photodiodes to the VCCDs and the latter of the two charge transfer pulses is applied (one vertical period or one field period).

Therefore, in order to control luminous exposure by means of an electronic shutter, how many electronic shutter pulses are to be applied since a given charge transfer pulse for transferring charges from the photodiodes to the VCCDs is applied is controlled. More specifically, the luminance level obtained by the luminance level detector 12 is compared to a reference luminance level, and if the obtained luminance level is higher than the reference luminance level, then the system controller 14 instructs the TG 4 to increase the number of electronic shutter pulses to be generated (i.e., pulses applied in a period between given two charge transfer pulses for transferring charges from the photodiodes to the VCCDs, and when the number of the electronic shutter pulses increases, an exposure time is shortened, accordingly). On the contrary, if the obtained luminance level is lower than the reference luminance level, then the system controller 14 instructs the TG 4 to decrease the number of electronic shutter pulses to be generated. With the above feed-back operation, exposure is stabilized at a suitable value.

However, there are following problems, especially in luminous exposure control, in the aforesaid conventional image sensing device.

(1) If a mechanical iris diaphragm meter or a motor is mounted, the size and the weight of the camera increases as well as energy consumption increases. This is fatal to a digital camera which is supplied with electrical power from a computer.

(2) There is a limitation determined by the video rate, an exposure time is 1/60 at maximum and 1/5000 at minimum. Accordingly, it is not practical to adjust luminous exposure by controlling the exposure time. It is possible to widen an adjustable range of luminous exposure by providing a couple of fixed iris diaphragms and switching between them, however, it is still not enough. Furthermore, for sensing a low luminance object, since the exposure time can be extended up to only 1/60 second, the lowest luminosity that the camera can sense is not low enough. This is fatal since it is difficult to sense an image inside of a building.

(3) Gains set in an amplifier for amplifying output signals from the image sensing device may be increased by 6 dB~18 dB when sensing a low luminance object, however, the S/N ratio increases, thus an obtained image would not be good.

(4) In a case of controlling a luminous exposure by using an electronic shutter, when the exposure time is to be shortened (when sensing a high luminance object), an increase or decrease of one electronic shutter pulse causes considerable change in exposure time, thereby the exposure time cannot be finely adjusted (more specifically, the electronic shutter pulse is generated during a horizontal return period so as to avoid adding noises to image signals, and applied at an interval of one horizontal period. Therefore, when shortening the exposure time, a ratio of one horizontal line period to the entire exposure period becomes high).

SUMMARY OF THE INVENTION

The present invention has been made in consideration of aforesaid situation, and has as its object to provide an image sensing apparatus and system capable of sensing an image at the highest possible rate that a computer can receive image data from an image sensing unit without any loss of the data.

According to the present invention, the foregoing object is attained by providing an image sensing apparatus which provides an external device with image signals, comprising: image sensing means for sensing an image and converting the image into image signals; and operating rate control means for controlling an operating rate of the image sensing means in accordance with a rate at which the external device receives the image signals from the image sensing apparatus.

The foregoing object is also attained by providing an image sensing system including an image sensing unit and a computer, comprising: image sensing means for sensing an image and converting the image into image signals; communication means for communicating between the image sensing unit and the computer; operating rate determination means for determining an operating rate of the image sensing means on the basis of a current operate of the image sensing means and a rate at which the computer receives the image signals from the image sensing unit and outputting a control signal for controlling the operating rate of the image sensing means in accordance with a determination result; and operating rate control means for controlling an operating rate of the image sensing means in accordance with the control signal outputted by the operating rate determination means.

The image sensing unit and the computer constructing the above image sensing system have the following structure.

Namely, the image sensing unit comprises: image sensing means for sensing an image and converting the image into image signals; output means for outputting information to be used for comparing an operating rate of the image sensing means to a rate at which the external device receives the image signals from the image sensing unit; input means for inputting a control signal for controlling an operating rate of the image sensing means from the external device; and operating rate control means for controlling an operating rate of the image sensing means in accordance with a control signal input by the input means.

Further, the computer comprises: input means for inputting signals from an image sensing unit; operating rate determination means for determining an operating rate of image sensing means of the image sensing unit on the basis of the signals input by the input means and generating a control signal for controlling the operating rate of the image sensing means on the basis of a determination result; and output means for outputting the control signal generated by the operating rate determination means to the image sensing unit.

The computer can also have operation means for calculating an operating rate of the image sensing means of the external image sensing apparatus for the next image sensing operation after the computer receives a predetermined amount of the image signals; and storage means for storing the operating rate calculated by the operation means.

With the above configuration, when image sensing operation is performed a plurality of times, it becomes unnecessary to determine the operating rate of the image sensing means each time in the second and later image sensing operations.

It is another object of the present invention to provide an image sensing device capable of obtaining an image sensed in a suitable exposure after the operating rate of an image sensing device is changed.

According to the present invention, the foregoing object is attained by providing an image sensing apparatus comprising: image sensing means for sensing an image and converting the image into image signals; operating rate changing means for changing an operating rate of the image sensing means; and luminous exposure control means for controlling an exposure value of the image sensing means after the operating rate of the image sensing means is changed in accordance with the operating rates before and after the operating rate of the image sensing means is changed.

The foregoing object is also attained by providing an image sensing system including an image sensing unit and a computer, comprising: image sensing means for sensing an image and converting the image into image signals; operating rate changing means for changing an operating rate of the image sensing means; communication means for communicating between the image sensing unit and the computer; exposure value determination means for determining an exposure value of the image sensing means after an operating rate of the image sensing means is changed, in accordance with the operating rates of the image sensing means before and after the operating rate is changed, and for outputting a control signal for controlling the exposure value of the image sensing means on the basis of a determination result; and luminous exposure control means for controlling an exposure value of the image sensing means after the operate of the image sensing means is changed in accordance with the control signal outputted by the exposure value determination means.

The image sensing unit and the computer configuring the above image sensing system have the following structure.

Namely, the image sensing unit comprises: image sensing means for sensing an image and converting the image into image signals; operating rate changing means for changing an operating rate of the image sensing means; output means for outputting information to be used for determining an exposure value of the image sensing means after the operating rate of the image sensing means is changed; input means for inputting a control signal for controlling an exposure value of the image sensing means after the operating rate of the image sensing means is changed; and luminous exposure control means for controlling the exposure value of the image sensing means after the operating rate of the image sensing means is changed in accordance with the control signal input by the input means.

Further, a computer comprises: input means for inputting signals from an image sensing unit; exposure value determination means for determining an exposure value of image sensing means of the image sensing unit after an operating rate of the image sensing means is change, on the basis of the signals input by the input means and for generating a control signal for controlling the exposure value of the image sensing means on the basis of a determination result; and output means for outputting the control signal generated by the exposure value determination means to the image, sensing unit.

It is still another object of the present invention to provide an image sensing apparatus having a wide luminance range for image sensing without iris diaphragm control, and consuming little electricity.

According to the present invention, the foregoing object is attained by providing an image sensing apparatus comprising: image sensing means for sensing an image and converting the image into image signals; measurement means for measuring brightness of the image on the basis of the image signals obtained by the image sensing means; a timing signal generator for generating timing signals necessary for operating the image sensing means; and frequency changing means for changing the frequency of reference clock which is referred by the timing signal generator on the basis of the brightness measured by the measurement means.

Further, in a case where the image sensing apparatus has an electronic shutter function in which charge stored in each pixels of the image sensing means is removed by applying an electrical shutter pulse of high voltage, if the brightness of the image measured by the measurement means is darker than predetermined brightness even when the exposure time changing means controls to apply less than a predetermined number of the electrical shutter pulses, the frequency changing means decreases the frequency of the reference clock, and if the brightness of the image measured by the measurement means is brighter than predetermined brightness even when the exposure time changing means controls to apply more than a predetermined number of the electrical shutter pulses, the frequency changing means increases the frequency of the reference clock.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

FIG. 14 is a timing chart for operating an image sensing device;

DETAILED DESCRIPTION OF THE PREFERRED EMBODIMENTS

Preferred embodiments of the present invention will be described in detail in accordance with the accompanying drawings.

First Embodiment
[Adjusting Operating Rate of an Image Sensing Device]

Figure 1:
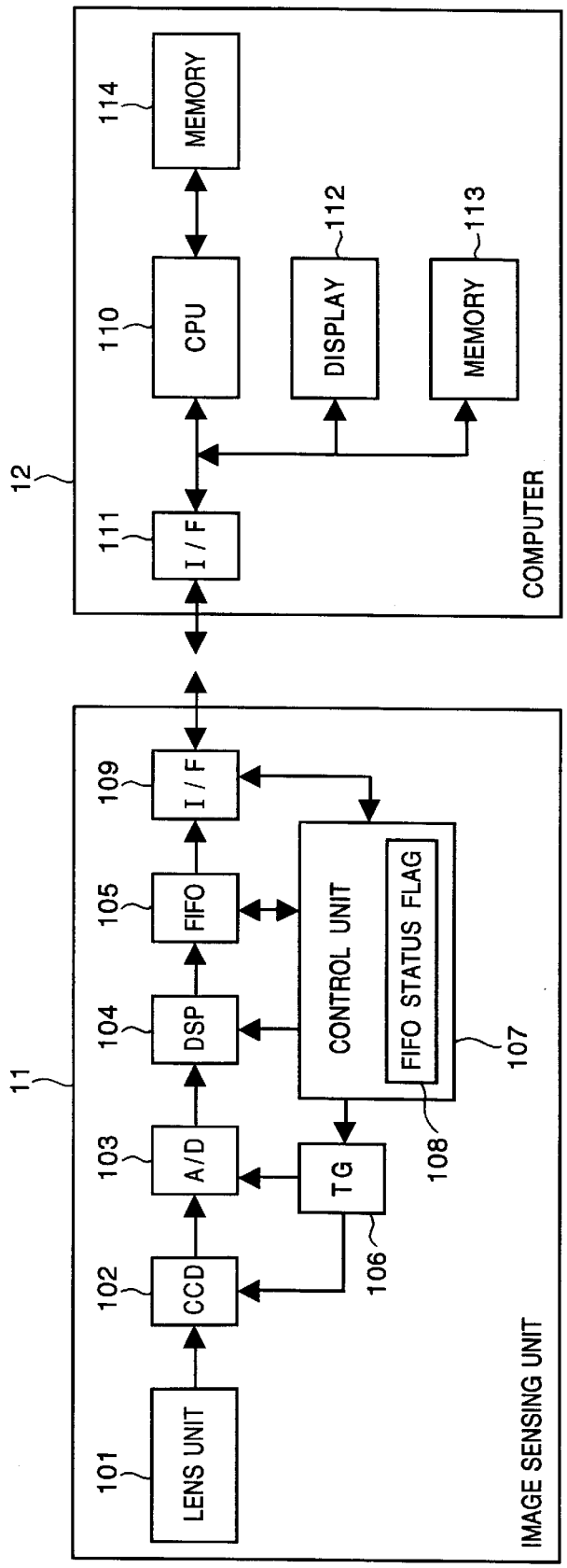
FIG. 1 is a block diagram illustrating a configuration of an image sensing system according to a first embodiment of the present invention.

FIG. 1 is a block diagram illustrating a configuration of an image sensing system according to the first embodiment, and in the image sensing system, an image sensing unit 11 is connected to a computer 12 to perform image sensing operation.

In the image sensing unit 11, reference numeral 101 denotes a lens unit; 102, a CCD; 103, an analog-digital (A/D) converter; 104, a digital signal processor (DSP); and 105, a FIFO memory. Further, reference numeral 106 denotes a timing signal generator (TG) for outputting timing pulses to the CCD 102 and the A/D converter 103. Reference numeral 107 denotes a control unit for the image sensing unit 11 and maintains a FIFO status flag 108 of the FIFO memory 105. Reference numeral 109 denotes an interface (I/F), such as the one conforming to the PCMCIA standard, for connecting to an external device.

In the computer 12, reference numeral 110 denotes a CPU; 111, an interface, such as the one conforming to the PCMCIA standard as the interface 109 of the image sensing unit 11; 112, a display, such as a liquid crystal display; 113, a memory; and 114, a memory for storing a program for image sensing operation.

An image sensing operation of sensing a still image by the image sensing system having the aforesaid configuration will be explained with reference to flowcharts in FIGS. 2 and 3.

In the image sensing system, the control of the image sensing unit 11 is performed on the basis of the image sensing program loaded on the CPU 110 from the memory 114 by transferring instructions to the control unit 107 through the interfaces 111 and 109.

An image sensing operation in the image sensing unit 11 is as follow.

Figure 2:
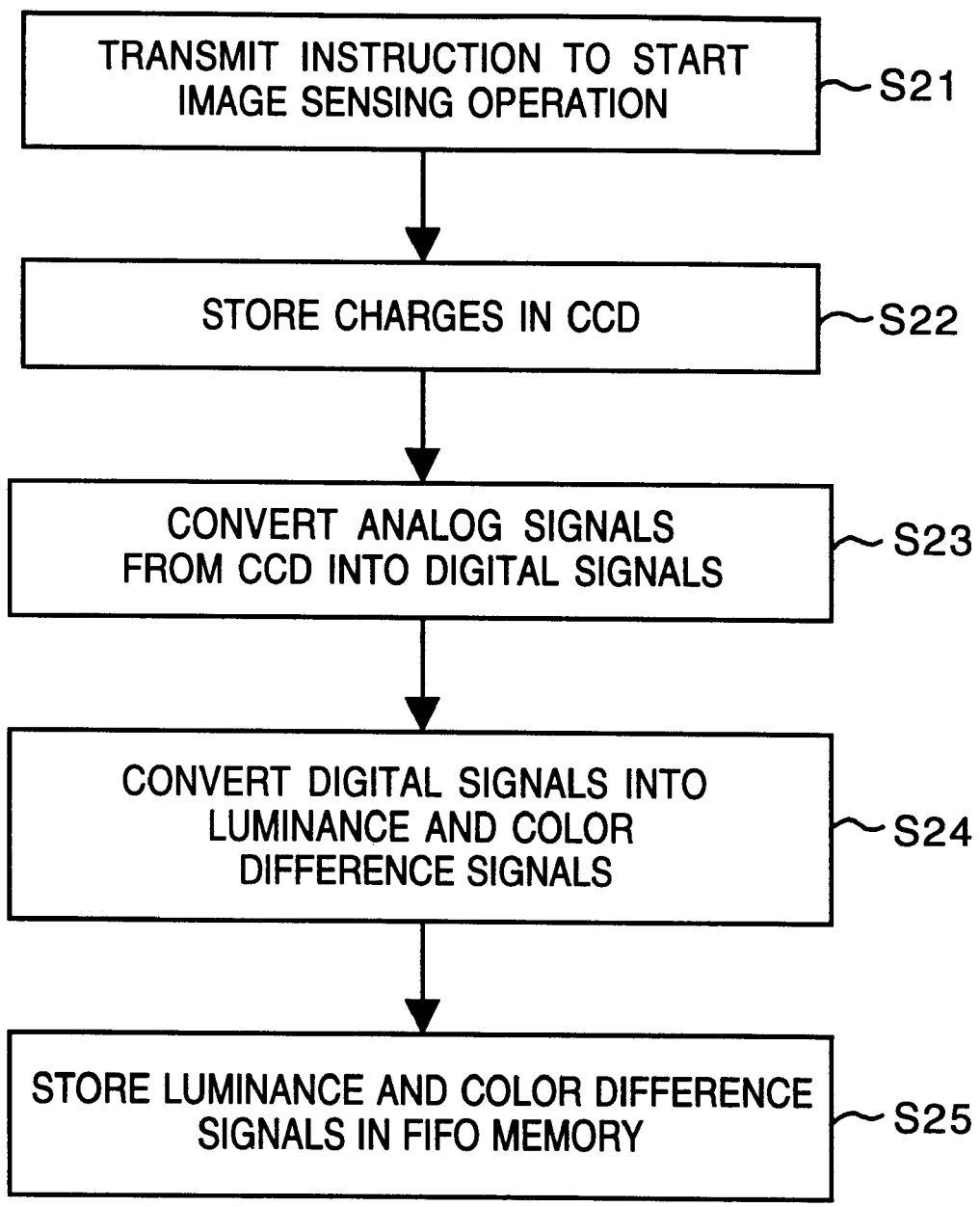
FIG. 2 is a flowchart showing an operation of an image sensing unit according to the first embodiment.

First at step S21 in FIG. 2, an instruction to start image sensing operation is transmitted to the control unit 107 in the image sensing unit 11 on the basis of the image sensing program.

Next at step S22, the image sensing unit 11 stores information on a still image in the CCD 102 as electric charges by using the lens unit 101 and the CCD 102. The control unit 107 controls the charge storage period in the CCD 102, and so on, through the TG 106.

Then, at step S23, charges stored in the CCD 102 are read out and enter the A/D converter 103. The timing to read out the charges from the CCD 102 is determined by the timing pulses sent from the TG 106, and the rate of the timing pulse is controlled by the control unit 107.

Digital signals converted from analog signals by the A/D converter 103 are further converted to luminance signals and color difference signals by the DSP 104 at step S24, then temporarily stored in the FIFO memory 105 at step S25.

The FIFO status flag 108 kept in the control unit 107 represents an amount of image signals stored in the FIFO memory 105, and it is updated as an image signal is inputted or outputted to/from the FIFO memory 105. In the first embodiment, there are four states: a state in which less than 50% of the FIFO memory 105 is occupied by image data (state F0); a state in which equal or greater than 50% to less than 75% of the FIFO memory 105 is occupied (state F1); a state in which equal or greater than 75% to less than 100% of the FIFO memory 105 is occupied (state F2); and a state in which the FIFO memory is full (state F3).

The following steps S23 to S25 are repeated until all the image signals, read out from all the pixels, which are stored at step S22 are processed.

Next, an operation in the computer will be explained. Here, a case where the image sensing unit 11 is designed so that the capacity of the FIFO memory 105 is Cf bytes, and an amount of data obtained from the CCD 102 in one image sensing operation is nCf/2 bytes (n is a positive integer) is explained. The reason for designing the image sensing unit 11 as above is that, if the computer receives image signals by an amount corresponding to a half of the capacity of the FIFO memory 105 as described below, no image signal is left in the FIFO memory 105 since the image data removed from the FIFO is a multiple of the capacity necessary to set F1.

Figure 3:
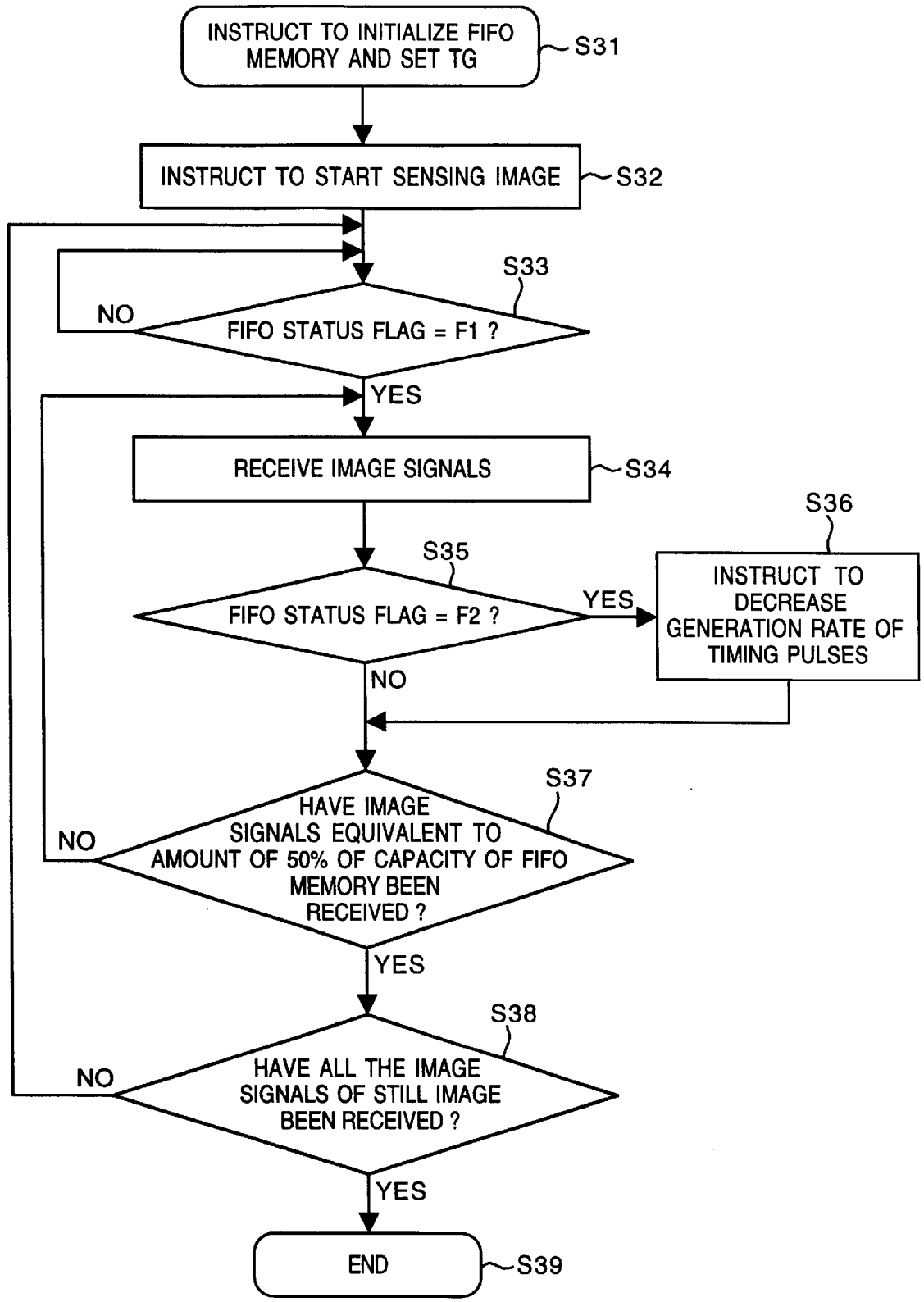
FIG. 3 is a flowchart showing an operation of a computer according to the first embodiment.

First, at step S31 shown in FIG. 3, the computer issues instructions to the control unit 107 to initialize the FIFO memory 105 and set the TG 106.

Next at step S32, the computer issues an instruction to the control unit 107 of the image sensing unit 11 to start sensing an image. In response to the instruction issued at step S32, image signals are sequentially stored in the FIFO memory 105 in the image sensing unit 11 at steps S22 to S25 as described above.

Then, at step S33, the computer supervises the FIFO status flag 108 via the interfaces 109 and 111. In the control unit 107 of the image sensing unit 11, as image signals are stored in the FIFO memory 105, the FIFO status flag 108 changes from F0 to F1, F1 to F2, and so on. When the FIFO status flag 108 indicates the state F1 at step S33, the process proceeds to step S34 where a predetermined amount of image signals are transmitted from the FIFO memory 105 though the interfaces 109 and 111, and stored in the memory 113 in the computer 12.

Thereafter, the FIFO status flag 108 is checked at step S35, and if it indicates the state F2, which shows that the rate of the computer 12 for receiving the image signals from the image sensing unit 11 is lower than the rate of the image sensing operation, the computer issues an instruction to the control unit 107 to control the TG 106 to lower the rate of generating timing pulses at step S36. Accordingly, the generation rate of timing pulses by the TG 106 are decreased, thereby the storing rate of the image signals read from the CCD 102 in the FIFO memory 105 in the image sensing unit 11 is decreased.

If the FIFO status flag 108 is not in the state F2 at step S35, or after the instruction for lowering the generation rate of the timing pulses is transmitted at step S36, the process proceeds to step S37 where whether the computer 12 has received image signals equivalent to an amount of 50% of the capacity of the FIFO memory 105 (Cf/2 bytes, in this case) in the processes at steps S33 to step S37 or not is determined.

If less than 50%, the process goes back to step S34 where the computer 12 receives the predetermined amount of image signals and stores them in the memory 113.

If it is determined that the computer 12 has received image signals equivalent to 50% of the capacity of the FIFO memory 105, whether all the image signals of a still image have stored in the computer 12 or not is determined at step S38. This determination can be performed by checking whether the computer 12 has received the image signals from the image sensing unit 11 2n times (n is the positive integer which is described above).

If it has not, then the process returns to step S33 where the computer 12 supervises the FIFO status flag 108 for preparing to receive the image signals stored in the FIFO memory 105.

If all the image signals of the still image have stored, then the still image sensing operation is completed at step S39.

[Modification]

Next, a modification for adjusting operating rate of an image sensing device will be described.

An image sensing operation of sensing a still image by the image sensing system according to the modification of the first embodiment will be explained with reference to flowcharts in FIGS. 2 and 4. Note, the configuration of the image sensing-system according to the modification of the first embodiment is the same as that of the first embodiment, thus, FIG. 1 is referred as the configuration of the image sensing system.

An operation in the image sensing unit 11 is also performed as described in the first embodiment with reference to the flowchart in FIG. 2. Regarding an image data receiving operation in the computer 12, it is performed as shown in the flowchart shown in FIG. 4.

Figure 4:
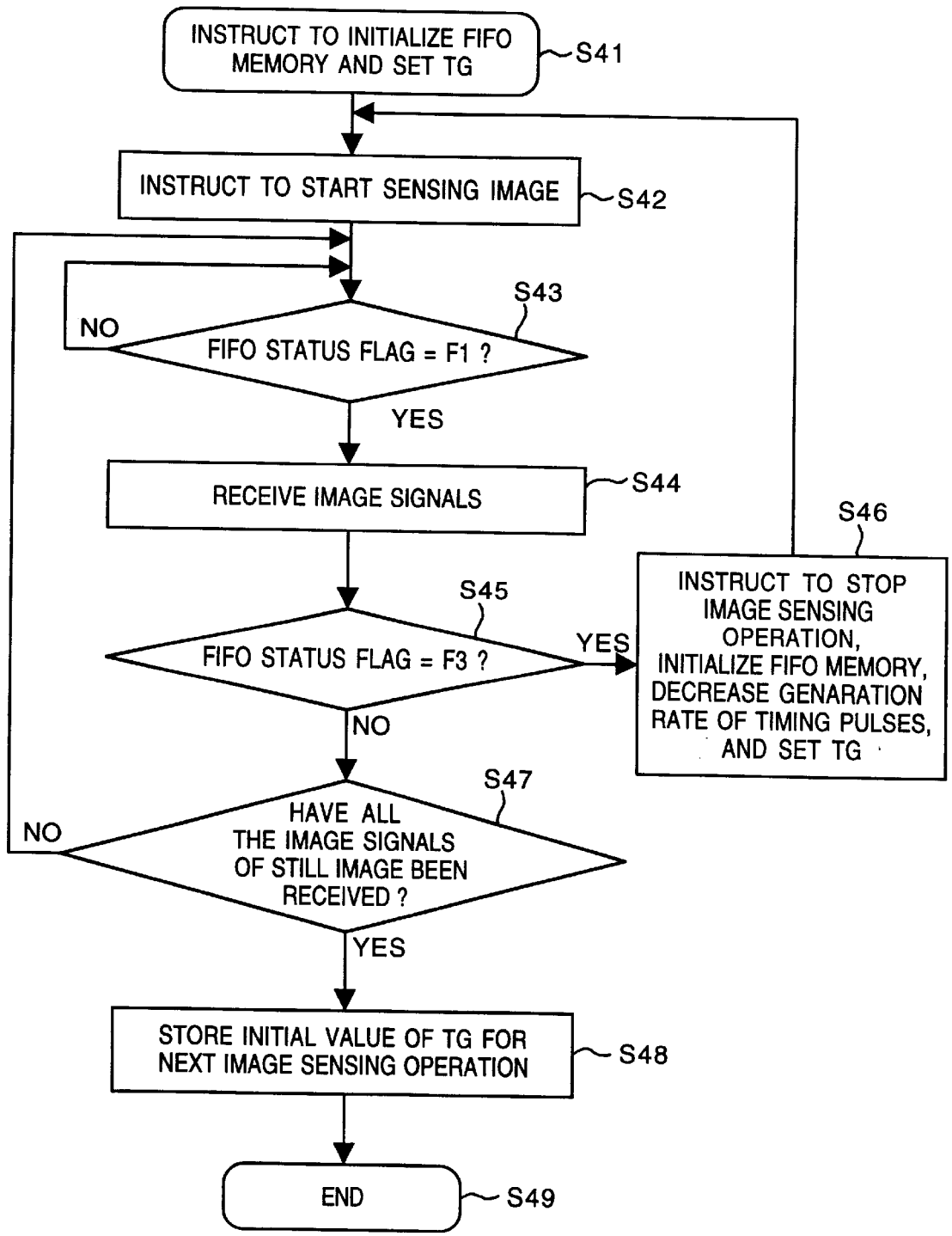
FIG. 4 is a flowchart showing an operation of a computer according to the first embodiment.

First, at step S41 in FIG. 4, the computer 12 issues instructions to the control unit 107 of the image sensing unit 11 to initialize the FIFO memory 105 and set the TG 106. At this time, the set value of the TG 106 is an initial value stored in a predetermined area of the memory 113 of the computer 12.

Next, at step S42, the computer 12 issues an instruction to the control unit 107 of the image sensing unit 11 to start image sensing operation.

Then, at step S43, the computer checks the FIFO status flag 108 through the interfaces 111 and 109.

There are four states indicated by FIFO status flag 108, F0 to F3, as in the case of the first embodiment. If the FIFO status flag 108 shows the state F1 at step S43, the process proceeds to step S44 where the computer receives image signals equivalent to an amount of 50% of the capacity of the FIFO memory 105 through the interfaces 109 and 111 and stores them in the memory 113 on the basis of the image sensing program stored in the memory 114.

Thereafter, at step S45, the computer 12 checks the FIFO status flag 108. If the FIFO status flag 108 indicates the state F3, then the computer 12 issues an instruction to the control unit 107 in the image sensing unit 11 to stop the image sensing operation at step S46, further issues an instruction to initialize the FIFO memory 105 and set the TG 106. Here, the newly set rate of generating timing pulses by the TG 106 is lower than the currently set rate by a predetermined value. Accordingly, the generation rate of timing pulses by the TG 106 is decreased, thereby the rate of storing image signals read from the CCD 102 in the FIFO memory 105 in the image sensing unit 11 is also decreased.

After step S46, the process goes back to step S42 where the computer issues an instruction to the control unit 107 in the image sensing unit 11 to start image sensing operation, and the image sensing operation starts from storing information on a new still image in the CCD as electric charges.

At step S45, if the FIFO status flag 108 does not show the state F3, then whether the computer 12 has received all the image signals of the still image or not is determined at step S47.

If it has not, the process returns to the step S43 where the computer 12 checks the FIFO status flag 108 again, then prepares for receiving image signals stored in the FIFO memory 105.

If the computer 12 has received all the image signals of the still image, an initial value of the TG 106 for sensing the next still image is calculated on the basis of the current rate of generating timing pulses by the TG 106, then the calculated value is stored in a predetermined area of the memory 113 in the computer 12 at step S48.

It should be noted that, in the aforesaid examples, a case where the CCD 102 and the FIFO memory 105 are designed so that an amount of data obtained from the CCD 102 in response to each read-out pulse is nCf/2 bytes (Cf: the capacity of the FIFO memory 105, n: a positive integer) is explained, however, the present invention is not limited to this. For example, if the capacity of a FIFO memory is small, image signals left in the FIFO memory after a computer last receives image signals may be abandoned, or a computer may repeat the processes at steps S33 to S37 the same number of times as an integer part of the quotient obtained by dividing the total amount of data obtained from the CCD by the half capacity of the FIFO, thereafter, receive all the image signals left in the FIFO memory.

For sensing the next image, the initial value of the TG 106 stored at step S48 can be used at step S41, it is possible to perform image sensing operation at a proper operating rate of the CCD (referred as "CCD operating rates", hereinafter) from the beginning.

The CCD operating rate at which an image sensing operation is successfully completed may be stored in the memory 113 in the computer 12. In this case, it is possible to calculated an initial value of the CCD operating rate on the basis of the stored operating rate in the next image sensing operation. Finally, the operation of sensing a still image is completed at step S49.

In the image sensing system of the present invention, a mark indicating that image sensing operation is in progress is displayed on the display 112 of the computer 12 to notify the user while performing image sensing operation just after an instruction to start image sensing operation is issued to the control unit 107 of the image sensing unit 11 at step S42. Then, after it is judged that the computer 12 has received all the image signals of a still image at step S47, the mark on the display 112 of the computer 12 is turned off.

In the first embodiment, the computer determines a CCD operating rate. However, it is possible to realize the present invention with the image sensing unit alone by providing a function of determining an operating rate to the image sensing unit.

According to the first embodiment as described above, in, an image sensing system including an image sensing unit having at least one connecting terminal and a computer having a connecting terminal capable of connecting to the image sensing unit, even if a rate of a computer for receiving image signals from the image sensing unit differs from one computer to another, the image sensing system can sense an image at the highest possible rate that a computer can receive image signals from an image sensing unit without any loss of the data.

Further, by storing an initial CCD operating rate, for the next image sensing operation, calculated on the basis of the CCD operating rate at which image sensing operation has been successfully completed, it is possible to start sensing image at a proper CCD operating rate in the next image sensing operation.

Furthermore, by displaying a mark indicating that image sensing operation is in progress on a display of a computer to notify the user during performing image sensing operation, it is possible to avoid difficulties in which a user carelessly moves an image sensing unit while sensing an image, not knowing the image sensing operation is in progress.

[Conjecturing Proper Exposure Value]

Conjecture of a proper exposure value when a generation rate of timing pulses is decreased for reading image signals from a CCD of a still image sensing unit will be explained below. Note, the present invention is not limited to a still image sensing unit, and applicable to any image sensing unit capable of changing the CCD operating rate.

Figure 5:
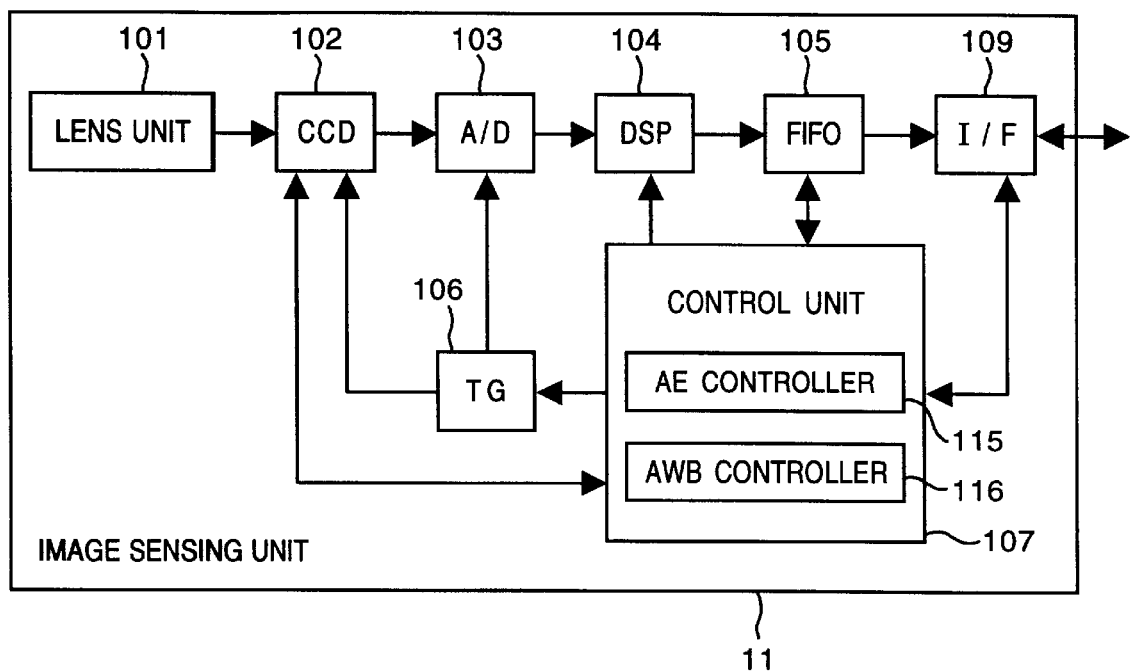
FIG. 5 is a block diagram illustrating a configuration of the image sensing unit according to the first embodiment.

As shown in FIG. 5, the image sensing unit has basically the same configuration as the one shown in FIG. 1 except units relating to luminous exposure control included in the control unit 107. Accordingly, explanation of the same parts as those shown in FIG. 1 is omitted, and only the different parts will be explained.

In FIG. 5, reference numeral 115 denotes an automatic exposure (AE) controller; and 116, an automatic white balance (AWB) controller.

The luminance level of a sensed image and data for white balance correction are obtained during image data of the sensed image is processed by the DSP 104, then enter the AE controller 115 and the AWB controller 116, respectively.

The luminance level of the sensed image and the data for white balance correction which entered the AE controller 115 and the AWB controller 116 are inputted to the computer 12 shown in FIG. 1 through the interfaces 109 and 111. The computer 12 calculates an electronic shutter value for the CCD 102 and parameters for white balance correction. Here, the electronic shutter value is an integer, and the product of the electronic shutter value and a unit time is exposure time. The calculated data is transmitted to the AE controller 115 and the AWB controller 116 as instructions, and the AE controller 115 controls the electronic shutter value of the CCD 102 to obtain an image at a proper exposure, and the AWB controller 116 controls so that the sensed image is expressed in proper color. The product of the electronic shutter value for the CCD 102 and a unit interval of a specific clock generated by the TG 106 is the exposure time of the CCD 102.

Next, an operation of the image sensing system having the aforesaid configuration is explained.

Figure 6:
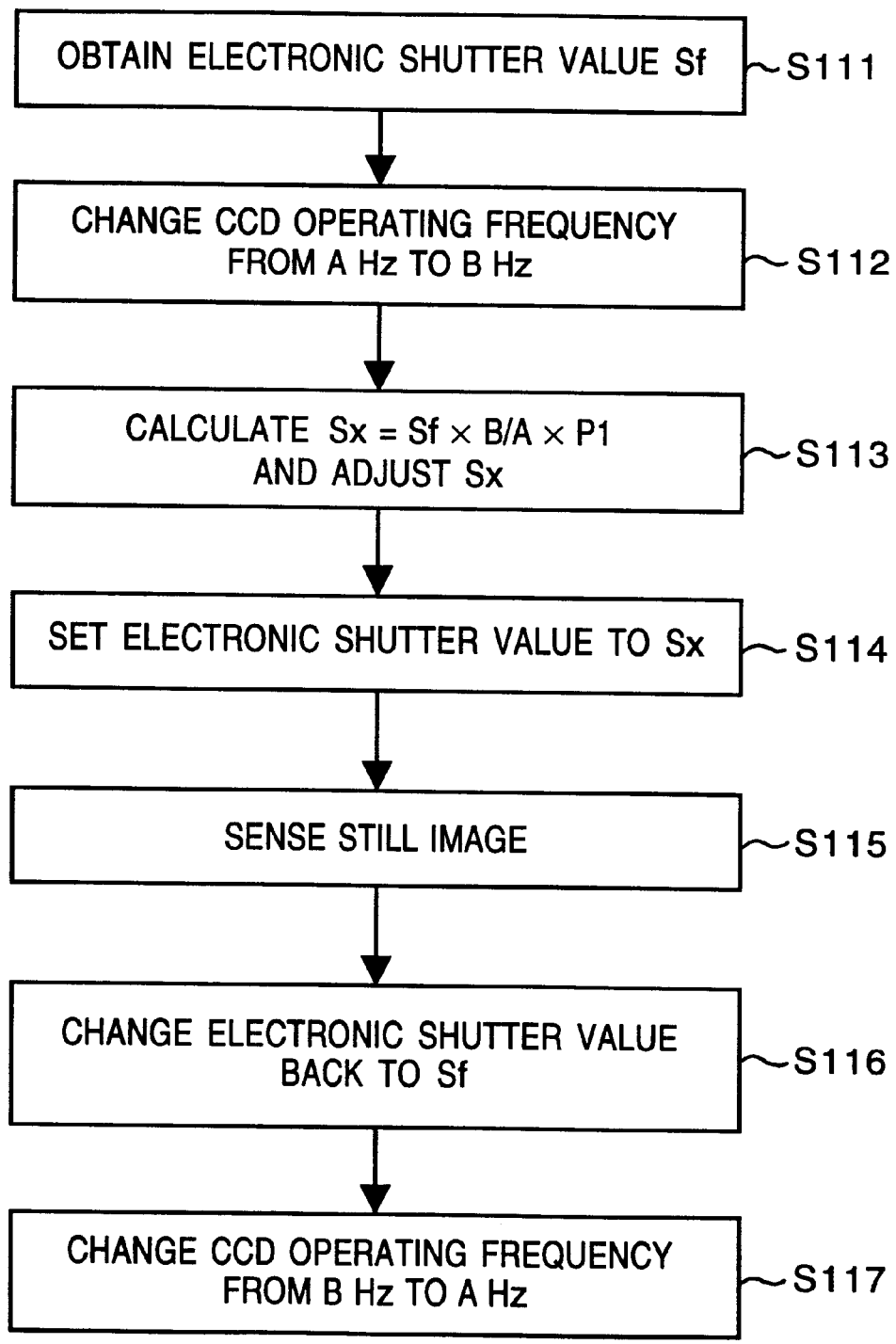
FIG. 6 is a flowchart showing an operation of a luminous exposure control according to the first embodiment.

FIG. 6 is a flowchart showing a method for conjecturing an electronic shutter value and a method for setting the conjectured value when the image sensing system is changed from a state of displaying a sensed image on the liquid crystal display to a state of sensing a still image in response an designation by a user.

First at step S111, the current electronic shutter value Sf of the CCD when displaying in the display 112 (shown in FIG. 1) is obtained. In this embodiment, if the luminance level of a sensed image is in a predetermined range, the image displayed on the display 112 can be sensed in a proper luminous exposure by controlling the electronic shutter value Sf to have a proper value by using the AE controller in the image sensing system. Further, in this embodiment, the electronic shutter value takes an integer between 1 and S, and the product of the electronic shutter value and a unit width of a specific clock generated by the timing generator is the exposure time. The exposure time is the shortest when the electronic shutter value is 1, and the exposure time is the longest when the electronic shutter value is S. Therefore, when the CCD is operated in the NTSC rate, for example, the value of S is about 240 at maximum, and when the CCD is operated in the PAL rate, the value of S is about 288 at maximum, although it differs depending upon a design of an image sensing unit. The value of S can be arbitrary set if it is equal or less than the above values.

Next, at step S112, the CCD operating rate (frequency) is changed from A Hz, which is an operating frequency for showing an image on the display 112, to B Hz which is an operating frequency for sensing a still image. In this embodiment, a still image is sensed in a higher resolution than the resolution of an image displayed on the display 112, thus the relationship between the operating rates is A>B.

Then, a proper electronic shutter value Sx for sensing a still image is conjectured on the basis of the electronic shutter value Sf, obtained at step S111, and the CCD operating frequency A Hz for displaying an image on the display 112 and the CCD operating frequency B Hz for sensing a still image.

The conjectured electronic shutter value Sx for sensing a still image is calculated in accordance with the following equation (1).

$$Sx = Sf \times B / A \times P1 \qquad \text{Equation (1)}$$

where P1 is a predetermined positive value for further adjusting the conjectured electronic shutter value to cope with a case where an image is outputted in different media before and after the CCD operating frequency is changed. For example, in this embodiment, when the exposure time is set slightly longer for displaying an image on the display 112 so as to achieve a better viewing condition, the exposure time is adjusted by multiplying by a value which is less than 1 for sensing a still image to be stored in a computer. In a case where the electronic shutter value Sx obtained as a result of the equation (1) is not an integer, the obtained value is rounded off to an integer. If the rounded-off value is 0, then Sx is set to 1.

At step S114, the electronic shutter value of the CCD is set to the value Sx obtained at step S113. Next at step S115, a still image is sensed. Then, at step S116, the electronic shutter value of CCD is changed back to the electronic shutter value Sf for displaying an image on the display 112. At last, at step S117, the CCD operating frequency is changed back to the operating frequency A Hz for displaying an image on the display 112, and the process is completed.

According to the above embodiment, it is possible to obtain a still image sensed at a proper exposure regardless of the change in CCD operating frequency.

[Modification]

In the modification, a still image sensing system having the same configuration as shown in FIG. 5 is used. The modification of the embodiment will be explained with reference to FIGS. 7 and 8.

Assuming that the value P1 is set to a value equal or less than A/B, since relationship between the CCD operating frequencies A Hz and B Hz is A>B, the relationship between the electronic shutter value Sf for displaying an image on the display 112 and the electronic shutter speed Sx, obtained at step S113 in FIG. 6, for sensing a still image is Sf>Sx.

Since the electronic shutter value Sf can take the value S at maximum, when the luminance level of an image is less than a predetermined value, luminous exposure control of the image for displaying on the display 112 becomes impossible.

However, there is a case where, if it is impossible to control luminous exposure for displaying an image on the display 112, it is possible to control luminous exposure to be a proper value for sensing a still image.

In t he above embodiment, since the electronic shutter value Sf takes an integer between 1 and S, the maximum value of the electronic shutter value Sx for sensing a still image is smaller than the value S, thereby the luminous exposure range controlled by the electronic shutter upon sensing a still image is narrowed.

Accordingly, in the modification, a method for conjecturing an electronic shutter value for sensing a still image at a proper exposure, in a case where an exposure value for displaying an image on a display can not be controlled to a proper value but the luminance level of the sensed image is more than a predetermined value, is explained.

Figure 7:
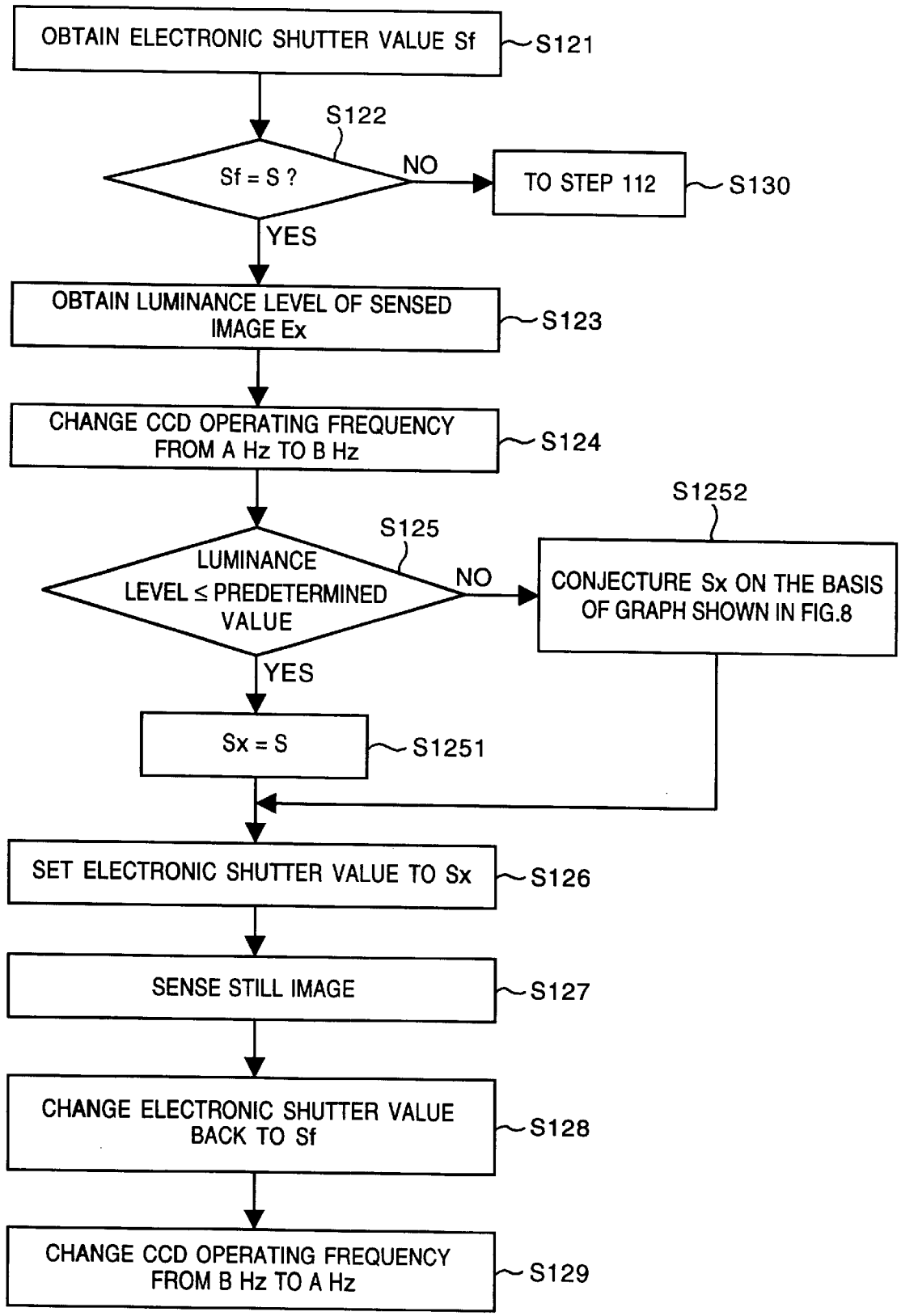
FIG. 7 is a flowchart showing an operation of a luminous exposure control according to the first embodiment.

Similarly to FIG. 6, FIG. 7 is a flowchart showing a method for conjecturing an electronic shutter value and a method for setting the conjectured value when the image sensing system shown in FIG. 5 is changed from a state of displaying a sensed image on the liquid crystal display to a state of sensing a still image in response an designation by a user.

First at step S121, a current electronic shutter value Sf of the CCD during displaying an image on the display 112 is obtained. The electronic shutter value Sf has the same characteristics as those explained in the above example.

Next, at step S122, whether it is impossible to control luminous exposure to a proper luminous exposure by changing the electronic shutter value Sf in displaying an image on the display 112 or not is determined. If the electronic shutter value Sf obtained at step S121 is not S (i.e., Sf<S), since the luminous exposure can be controlled to a proper luminous exposure by using the method explained in the above embodiment, the process goes to step S130, and the electronic shutter value Sx for sensing a still image is obtained in the method explained as above. If the electronic shutter value Sf obtained at step S121 is S, since it is not possible to obtain a proper electronic shutter value in the method described in the above embodiment, the electronic shutter value Sx is obtained in the following method.

First at step S123, the luminance level Ex of an sensed image displayed on the display 112 is obtained. Then, at step S124, the CCD operating rate (frequency) is changed from A Hz which is a CCD operating frequency for showing an image on a display to B Hz which is a CCD operating frequency for sensing a still image. Next, the proper electronic shutter value Sx for sensing a still image is conjectured on the basis of the value Ex, obtained at step S123, in the following method.

Figure 8:
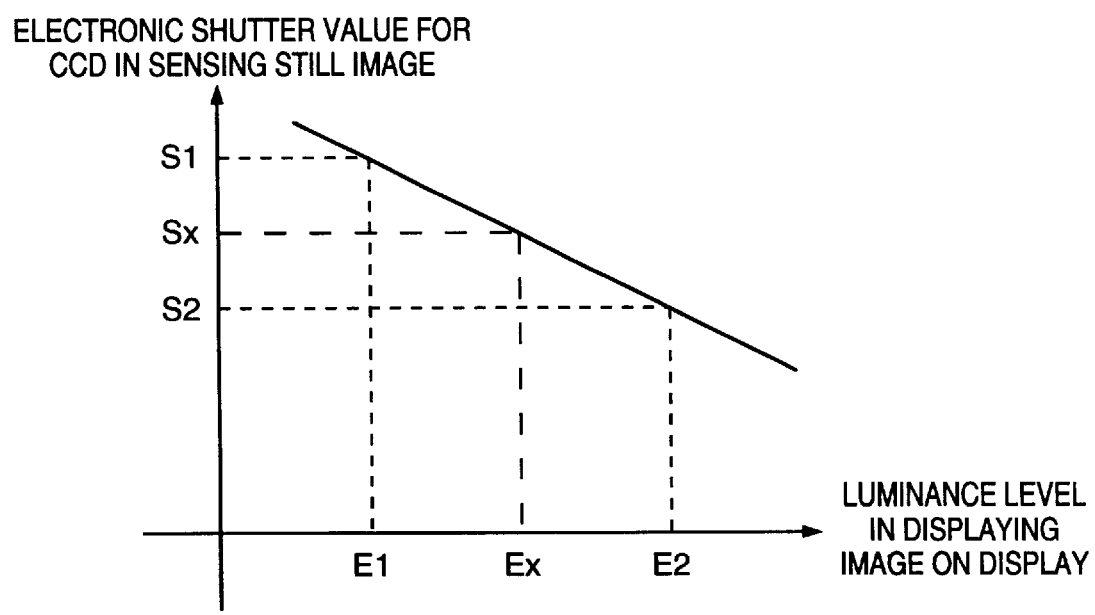
FIG. 8 is a graph for explaining a method for conjecturing an electronic shutter value according to the first embodiment.

If the luminance level Ex is equal or less than a predetermined value (YES at step S125), since the luminance level is outside of the luminous exposure range in which the luminous exposure of image to be sensed can be controlled properly after the CCD operating frequency is changed, the electronic shutter value Sx is set to the maximum value S (step S1251). Whereas, if the luminance level Ex is greater than the predetermined value (NO at step S125), the electronic shutter value is controlled in the following operational sequence. FIG. 8 is a graph for explaining a method for conjecturing a proper electronic shutter value Sx for sensing a still image according to the embodiment. In FIG. 8, reference numerals E1 and E2 are luminance values of two images displayed on a display, and reference numerals S1 and S2 are electronic shutter values with which still images corresponding to the above two images can be obtained at a proper exposure after lowering the CCD operating frequency when the luminance values in displaying the images on the display are E1 and E2.

In this case, a proper electronic shutter value Sx for sensing a still image is defined by a y-coordinate value of a point, whose x-coordinate value is Ex, which is on a straight line passing through the points (E1, S1) and (E2, S2) in a space whose x axis represents luminance level in displaying an image on a display and y axis represents electronic shutter value with which an image can be sensed at a proper exposure (step S1252).

The aforesaid relationship can be expressed in an equation as follow.

$$Sx=(S1-S2)\times(Ex-E1)/(E2-E1)+S2 \qquad \text{Equation (2)}$$

In the embodiment, luminance levels of two images displayed on the display and electronic shutter values with which proper luminous exposures can be achieved with respect to corresponding luminance levels serve as sample points. It is also possible to obtain the electronic shutter value Sx for sensing a still image in the same method as above when more than two sample points are taken into consideration.

For example, assume that the sample points are (E1, S1), (E2, S2) and (E3, S3), where E1<E2<E3. If the luminance level Ex in displaying an image on the display is less than E2, then a proper electronic shutter value Sx can be conjectured by using the sample points (E1, S1) and (E2, S2), and if the exposure value Ex is greater than E2, then a proper electronic shutter value Sx can be conjectured by using the sample points (E2, S2) and (E3, S3). By using a greater number of sample points, it is possible to perform the better conjecture for determining an electronic shutter value.

Note, the graph, shown in FIG. 8, illustrating relationship between luminance levels and electronic shutter values differs depending upon CCD operating frequencies before and after the change, plural sets of data for those graphs are stored.

Processes at steps S126 to S129 are the same as those at steps S114 to S117 in FIG. 6, respectively, the explanation of these processes are omitted.

According to the modification as described above, it is possible to perform better conjecture for determining an electronic shutter value for sensing a still image.

In the above embodiments, an image sensing unit and an external device is physically connected with wire to communicate, however, the present invention is not limited to this, and image signals, commands, and so on, may be transmitted by wireless means.

Further, in the above embodiment, an example in which an electronic shutter value is conjectured by performing operations, however, the electronic shutter value after the CCD operating frequency is changed can be conjectured by using a conversion table stored in a ROM and the like.

Further, in the first embodiment, the computer determines an electronic shutter value, however, it is possible to realize the present invention with the image sensing unit alone by providing a function of determining an electronic shutter value by operation or by using a conversion table to the image sensing unit.

According to the first embodiment as described above, it is possible to set an electronic shutter value, with which an image can be sensed at a proper exposure, of an image sensing device after the rate of operating the image sensing device is changed.

Second Embodiment

Figure 9:
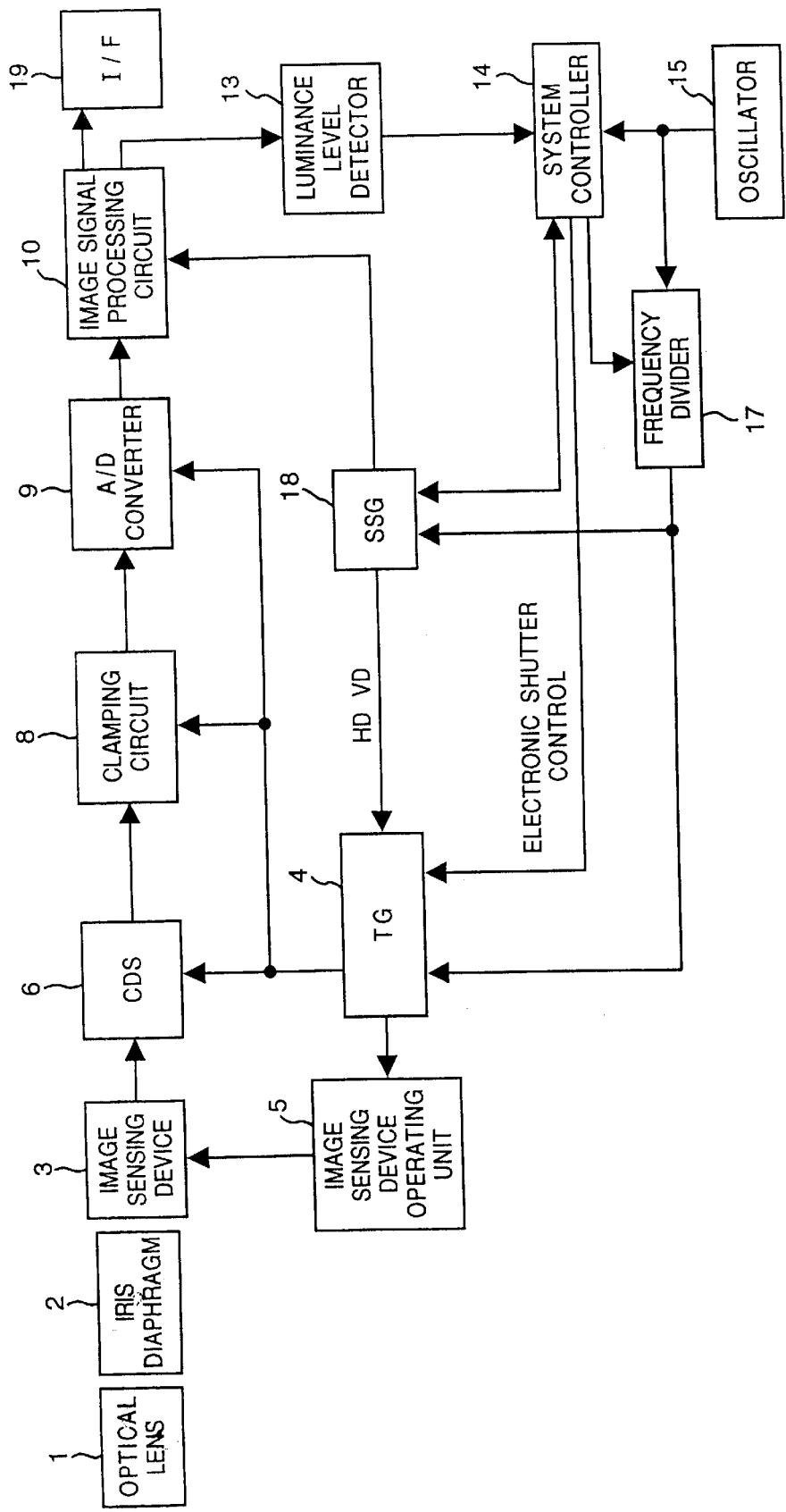
FIG. 9 is a block diagram illustrating a configuration of an image sensing unit according to a second embodiment.
Figure 10:
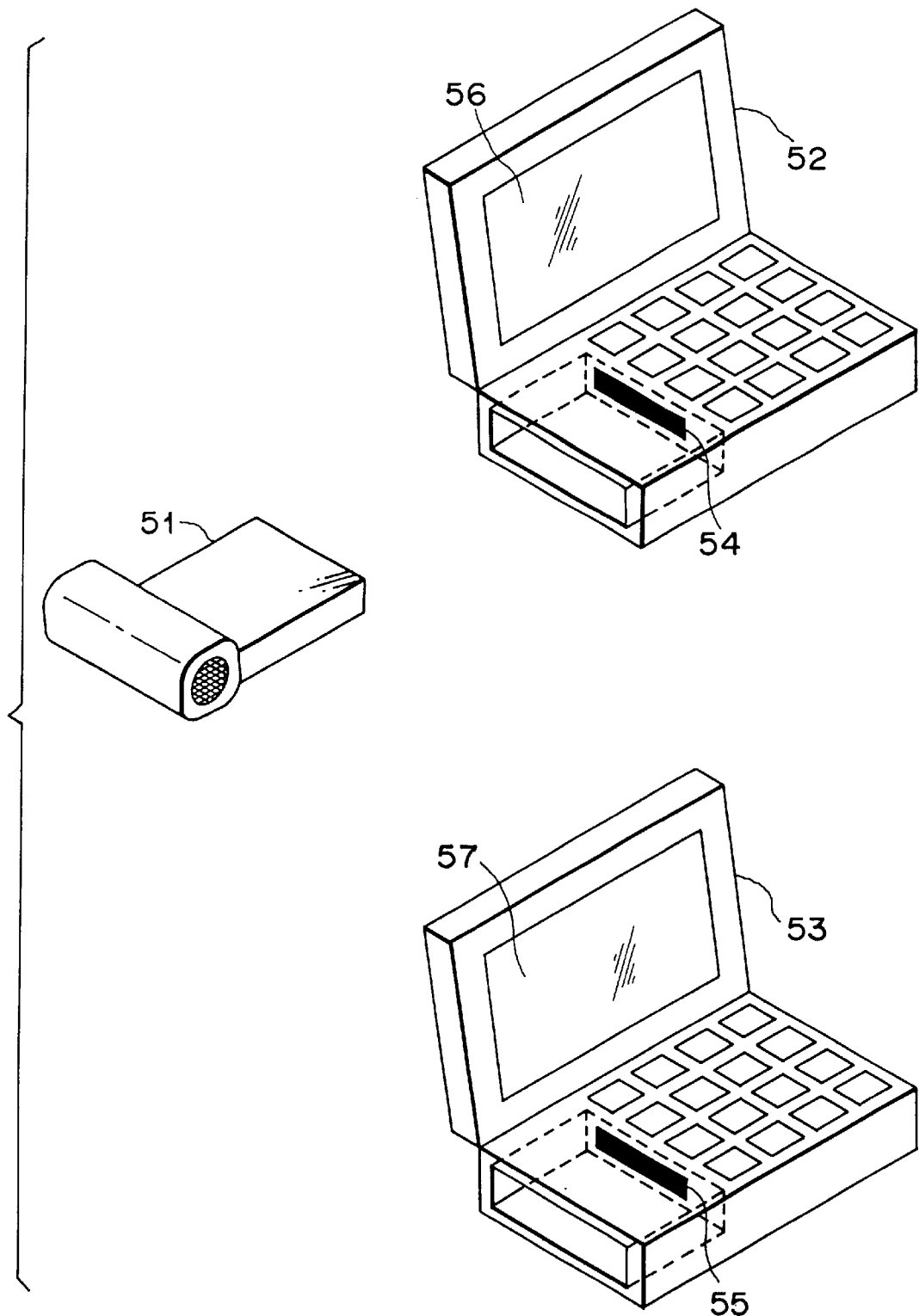
FIG. 10 is a view showing a structure of a conventional image sensing system.
Figure 11:
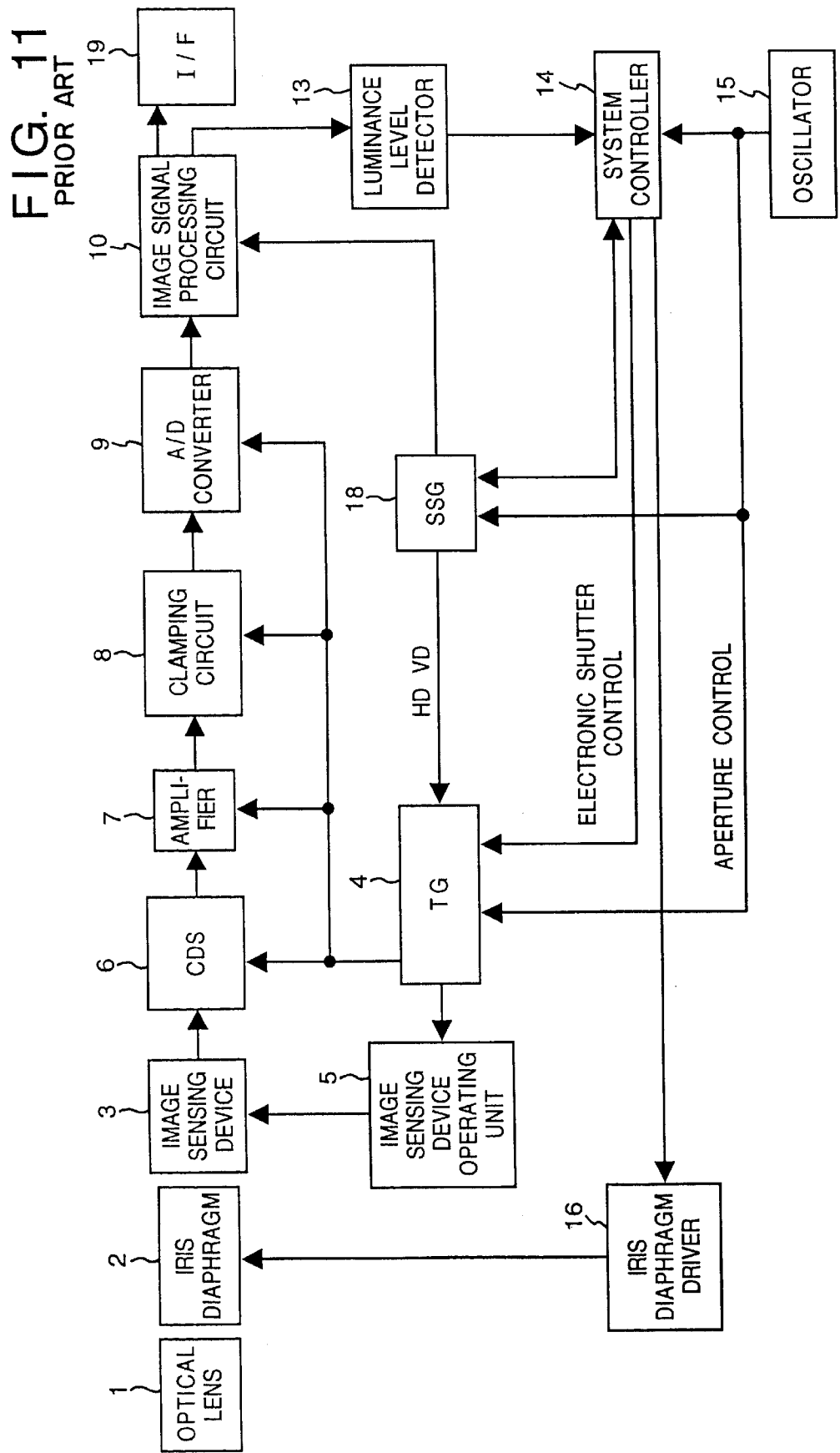
FIG. 11 is a block diagram illustrating a configuration of a conventional image sensing unit.
Figure 12:
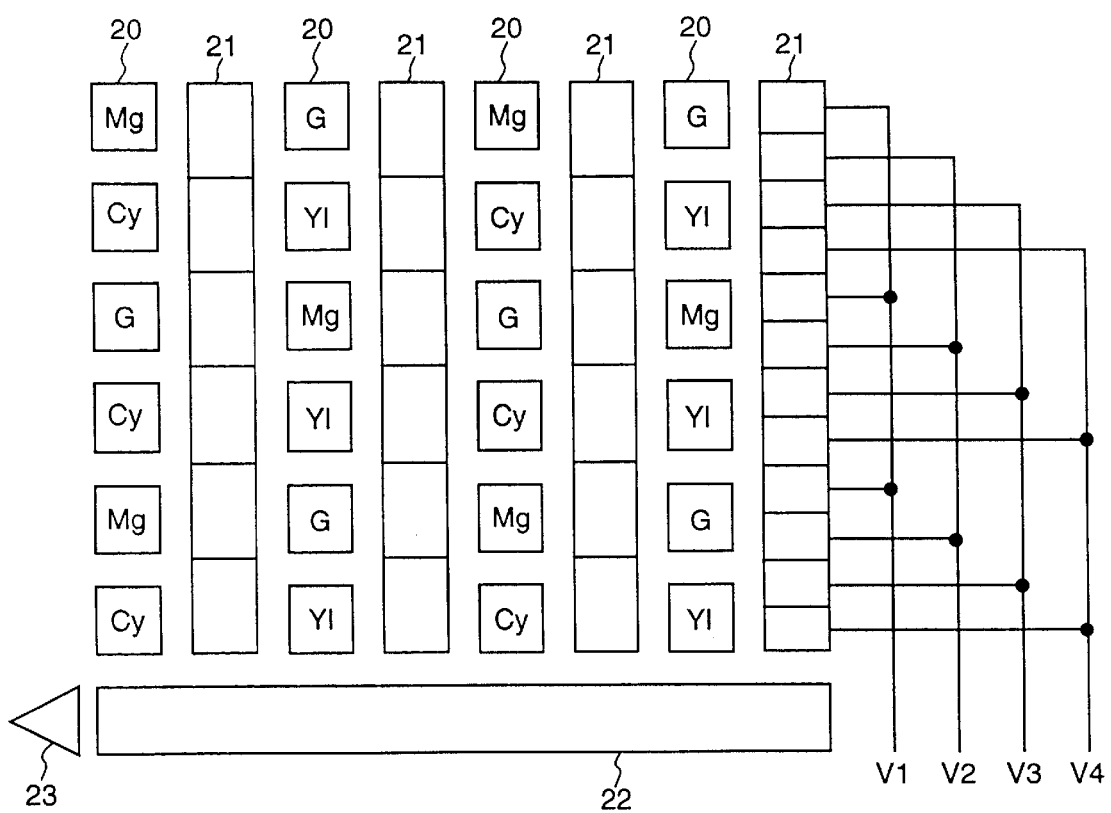
FIG. 12 is an explanatory view showing a configuration of an image sensing device.
Figure 13A:
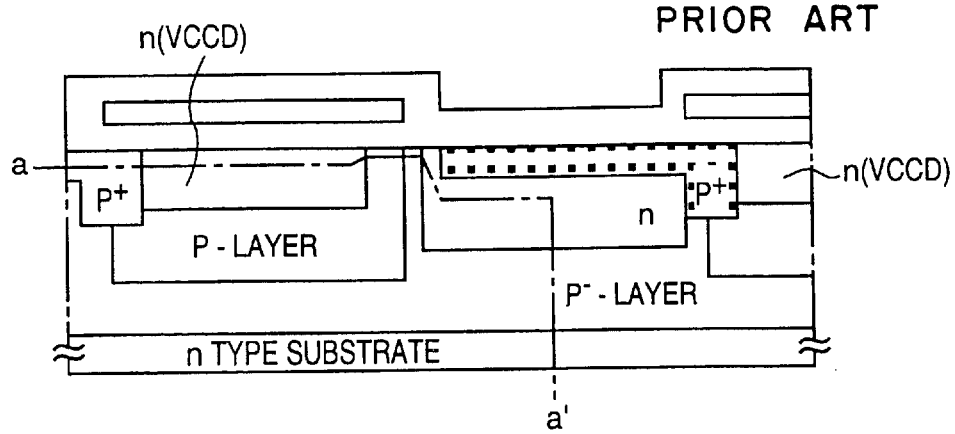
FIGS. 13A and 13B are explanatory views showing a detail of a pixel.
Figure 13B:
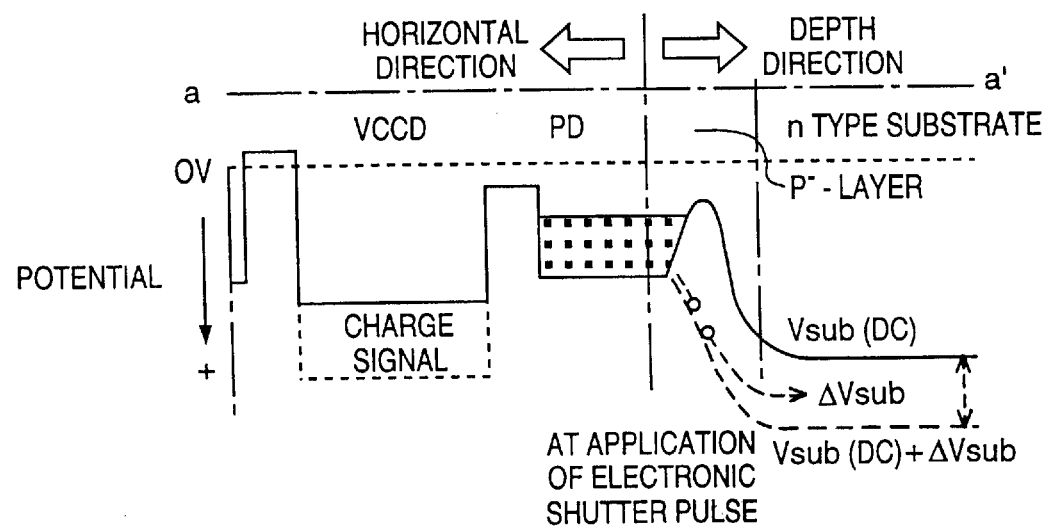

FIG. 9 is a block diagram illustrating an internal configuration of an image sensing unit, such as a digital camera, to be connected to a computer according to the second embodiment, and the same reference numerals as those in FIG. 11 denote the same units and elements.

In FIG. 9, reference numeral 1 denotes an optical lens for forming an optical image of an object; 2, an iris diaphragm whose aperture is fixed; 3, an image sensing device for converting the optical image of the object into electric signals; 4, a timing generator (TG) for generating timing signals necessary for operating the image sensing device 3; and 10, an image signal processing circuit which is a digital processing circuit.

Further, reference numeral 5 denotes an image sensing device operating unit; 6, a correlated double sampling (CDS) circuit for removing noises; 8, a clumping circuit for fixing black level; 9, an analog-digital (A/D) converter for converting analog signals to digital signals; 10, the image signal processing circuit for processing output signals from the image sensing device 3 and generating image signals of predetermined type; 18, a synchronizing signal generator (SSG) for generating timing signals (synchronizing signals) necessary for processes performed by the image signal processing circuit 10; 19, an interface (I/F); 13, a luminance level detector; 14, a system controller for controlling overall operation of the image sensing unit; 15, an oscillator for generating base clocks; and 17, a frequency divider for changing the base clocks from the oscillator into clocks having an arbitrary frequency (reference clock).

The system controller 14 and the frequency divider 17 construct control means for arbitrarily controlling the frequency of reference clock which enters the TG 4 and SSG 18 and serves as a reference clock for generating timing signals and synchronizing signals. The illuminance (quantity of light) of an optical image formed on the image sensing device 3 is controlled by changing the frequency of the reference clock. At that time, when the illuminance of the optical image formed on the image sensing device 3 is low (i.e., the quantity of light is small), the frequency of the reference clock to be inputted to the TG 4 and the SSG 18 is decreased, whereas when the illuminance is high (i.e., quantity of light is large), the frequency of the reference clock to be inputted to the TG 4 and the SSG 18 is increased.

Further, in a case where the image sensing device 3 has an electronic shutter function, the aforesaid control means can control the electronic shutter of the image sensing device 3 by changing the frequency of the reference clock to be inputted to the TG 4 and the SSG 18. If the luminance level of the object is less than a predetermined value (i.e., when it becomes impossible to control the illuminance of the optical image formed on the image sensing device 3 by the electronic shutter function), the frequency of the reference clock to be inputted to the TG 4 and the SSG 18 is decreased, whereas if the luminance level is higher than the predetermined value (i.e., when it becomes impossible to control the illuminance of the optical image by the electronic shutter function), the frequency of the reference clock is increased.

Further, in a case where the image sensing device 3 has an electronic shutter function adopting a method of removing charge in each pixel by applying high voltage pulse to its substrate (as described in the background of the invention, a period of time between when the last high voltage pulse (shutter pulse) is applied and when charges stored in the image sensing device 3 are read out is an exposure time), the control means can control the electronic shutter function of the image sensing device 3 also by changing the frequency of the reference clock to be inputted to the TG4 and the SSG 18, similarly to the case as described above. The detail of the processes for changing the frequency of the reference clock in this case will be explained below.

Next, a method of controlling exposure according to the second embodiment will be explained. In this controlling method, a period of time for charging the image sensing device 3 is controlled by changing the number of the shutter pulses to be applied as described in the background of the invention.

Let the frequency of the reference clock outputted from the frequency divider 17 shown in FIG. 9 be fs Hz. However, since a digital camera used with a computer does not have to conform to the video signal standard, the clocks do not have to have the frequency of clocks necessary to satisfy the video signal standard.

Therefor, the frequency fs can be determined depending upon the purpose and configuration of a digital camera.

In a case of sensing an image by operating the TG 4 and the SSG 18 in accordance with the frequency fs at fs(1), which is a given frequency, if an obtained luminous exposure is less than a proper luminous exposure even when an electronic shutter of the image sensing device 3 opens for the maximum exposure period (e.g., when no electronic shutter pulse is generated), in other words, when information on luminance level from the luminance level detector 13 is less than a reference luminance level, the system controller 14 instructs the frequency divide 17 to halve the frequency of output reference clock. The frequency divider 17 outputs pulses of fs(1)/2 Hz. Accordingly, the periods of timing signals and synchronizing signals outputted from the TG 4 and the SSG 18 are doubled, therefore, the periods of horizontal operating pulses (HD) and vertical operating pulses (VD), as well as the interval between electronic shutter pulses ΦVsub are also doubled.

Then, the TG 4 and the SSG 18 respectively generate timing signals and synchronizing signals on the basis of the clocks of fs(1)/2 Hz, and the luminous exposure is again controlled by using the electronic shutter. At this time, if the obtained luminous exposure is less than a proper luminous exposure even when the electronic shutter of the image sensing device 3 opens for the maximum exposure period, the system controller controls the frequency divider 17 to further halve the current frequency and to output a reference clock having the frequency of fs(1)/4 Hz.

By controlling as described above, it is possible to realize a digital camera capable of responding to a wide luminance range of an object without a mechanical analog iris diaphragm for controlling luminous exposure. Further, since the gain is not increased in an amplifier, the S/N ratio of a sensed image of a low luminance object is not deteriorated, consequently the amplifier for amplifying image signals of the low luminance object becomes unnecessary.

Next, to control luminous exposure when sensing a high luminance object will be explained. Assume that, when the TG 4 and the SSG 18 are operated in accordance with the frequency of fs(1), the image sensing operation is performed. When an obtained luminous exposure is higher than the proper luminous exposure, in other words, when information on luminance level from the luminance level detector 13 is higher than the reference luminance level, if the electronic shutter opens for the minimum exposure period in the frequency fs(1) (i.e., the number of the applied shutter pulses is the maximum), the system controller 14 instructs the frequency divider 17 double the frequency of the output reference clock. Then, the frequency divider 17 outputs pulses of 2fs(1) Hz.

Thereafter, the TG 4 and the SSG 18 respectively generate timing signals and synchronizing signals on the basis of the clocks of 2fs(1) Hz, and the luminous exposure is again controlled by using the electronic shutter. At this time, if the obtained luminous exposure is higher than the proper luminous exposure even when the electronic shutter of the image sensing device 3 opens for the minimum exposure period, the frequency divider 17 further doubles the current frequency and outputs a reference clock having the frequency of 4fs(1) Hz.

By controlling as described above, it is possible to realize a digital camera capable of sensing an object of a wide luminance range. In addition, since the frequency of the reference clock is increased, the interval between electronic shutter pulses is shortened, thereby the difference in exposure time depending upon increase or decrease of one electronic shutter pulse becomes small. As a result, it is possible to perform delicate control on luminous exposure upon sensing a high luminance object.

In controlling luminous exposure when sensing a high luminance object, when the number of applied electronic shutter pulses is near its maximum, the change of luminous exposure in response to increase or decrease of one electronic shutter pulse is still not ignorable since the increase or decrease of one electronic shutter pulse can cause great change in the exposure. Accordingly, it is difficult to control luminous exposure near that range. To overcome this problem, the frequency of the reference clock is increased when the number of applied electronic shutter pulses becomes equal or greater than a predetermined value, m, thus it is possible to prevent great change in the exposure in response to fluctuation of detected luminance levels.

In the following paragraphs, an operation of decreasing the frequency of the reference clock for increasing the luminous exposure will be explained in relation to the above problem and the operation of increasing the frequency of the reference clock in accordance with the value, m, as a method of solving the problem.

When a luminous exposure is controlled by controlling the frequency of the reference clock outputted from the frequency divider 17 and the number of the applied electronic shutter pulses as described above, the obtained luminance levels of an object before and after the frequency of the reference clock is changed from fs(1) Hz to fs(1)/2 Hz in an operation of increasing aluminous exposure (i.e., decreasing the number of the applied electronic shutter pulses and the frequency of the reference clock outputted from the frequency divider 17) are different from each other. Further, obtained luminance levels before and after the frequency of the reference clock is changed from fs(1)/2 to fs(1) in an operation of decreasing a luminous exposure (increasing the number of the applied electronic shutter pulses and the frequency of the reference clock outputted from the frequency divider 17), are also different from each other, for example. Accordingly, luminous exposure controlled by using electronic shutter pulses is sometimes performed delicately, but sometimes roughly, since the increase or decrease of one electronic shutter pulse can cause great change in the exposure. In order to narrow or eliminate such the luminous exposure range, instead of decreasing the frequency of the reference clock outputted from the frequency divider 17 when no more electronic shutter pulse can be omitted for increasing luminous exposure, the frequency of the reference clock is decreased when the number of the applied electronic shutter pulses becomes less than a predetermined value, n.

The predetermined values m and n can be arbitrarily selected in consideration of acceptable width of the fluctuation of the luminance level and of characteristics of an image sensing unit. Note, it is possible to set different values to m and n when the frequency of the reference clock is changed from fs(1) Hz to fs(1)/2 Hz and from fs(1)/2 Hz to fs(1), and when the frequency is changed from fs(1) Hz to 2fs(1) and from 2fs(1) Hz to fs(1) Hz. In these cases, the values m and n may be arbitrarily set in consideration of characteristics of an image sensing unit.

As described above, by adding a unit for changing the frequency of the reference clock which is inputted to the TG4 and SSG 18, instead of a conventional automatic exposure controller, it is possible to realize a digital camera having wide luminous exposure range without any iris diaphragm (alternatively, with an iris diaphragm whose aperture is fixed).

It should be noted that the frequency of the reference clock is obtained by dividing or multiplying the frequency of the base clocks by an positive integer, however, the present invention is not limited to this. It is possible to perform finer control on the frequency of the reference clock by dividing or multiplying the frequency of the base clocks by an arbitrary value.

Further, there is a case where it is effective to control the frequency of the reference clock by dividing or multiplying the frequency of the base clocks by a larger value than the value used in the second embodiment. Accordingly, by properly setting the value to divide or multiply the frequency of the base clocks, the maximum clock frequency, and the minimum clock frequency in consideration with a purpose of the digital camera, characteristics of the image sensing device 3, and characteristics of other circuits, it is possible to obtain a camera capable of sensing an object of wide luminance range without an iris diaphragm.

Further, the iris diaphragm whose aperture is fixed is used in the second embodiment, by providing a couple of iris diaphragms whose apertures are fixed and by switching them, it is possible to further widen a luminance range in which the camera can sense.

According to the second embodiment as described above, a control unit for controlling the frequency of clocks to be referred by the timing generator which generates timing signals necessary for operating an image sensing device and signal processing is provided, it is possible to control the quantity of incoming light which incidents on the image sensing device by changing the frequency of the clocks, thereby the luminance range the image sensing unit can sense is widened without controlling aperture of an iris diaphragm, with less electricity consumption.

Embodiment

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

Figure 15:
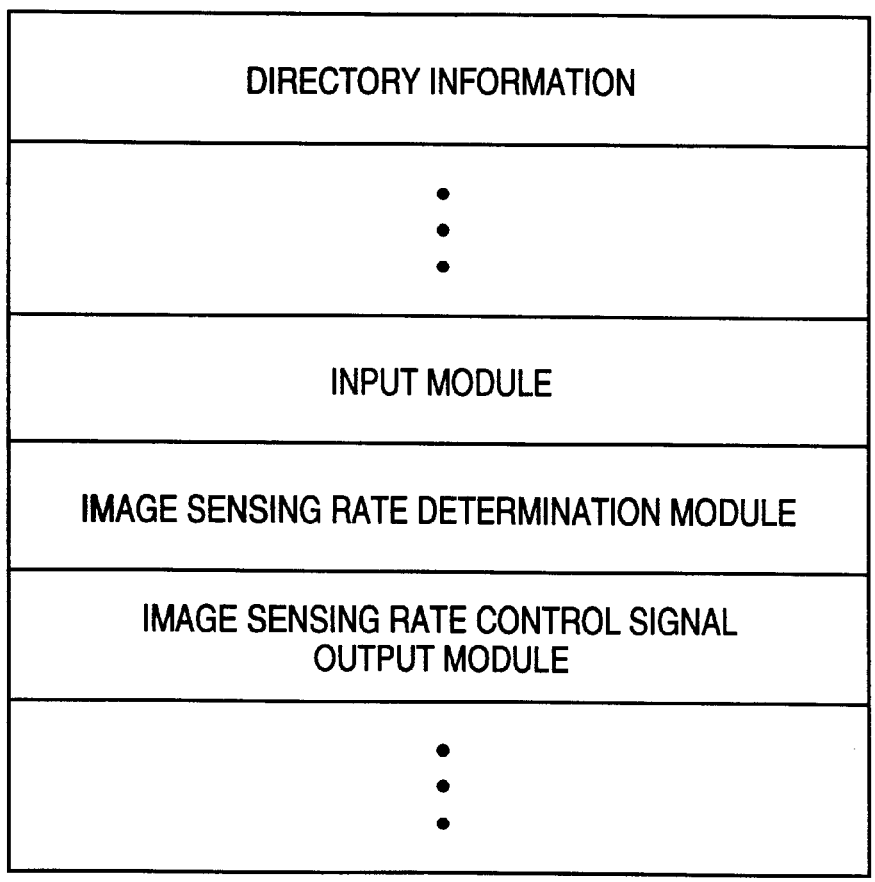
FIG. 15 is a memory map when a program module capable of realizing an operation of a computer according to the first embodiment of the present invention is stored in a storage medium.

In a case where the present invention is applied to the aforesaid storage medium, the storage medium stores program codes corresponding to the flowcharts described in [Adjusting Operating rate of an Image Sensing Device] in the first embodiment. Briefly, the storage medium stores each module shown as an example of a memory map in FIG. 15. More specifically, program codes which correspond to input module, image sensing rate determination module, and image sensing rate control signal output module, at least, are to be stored in the storage medium.

Figure 16:
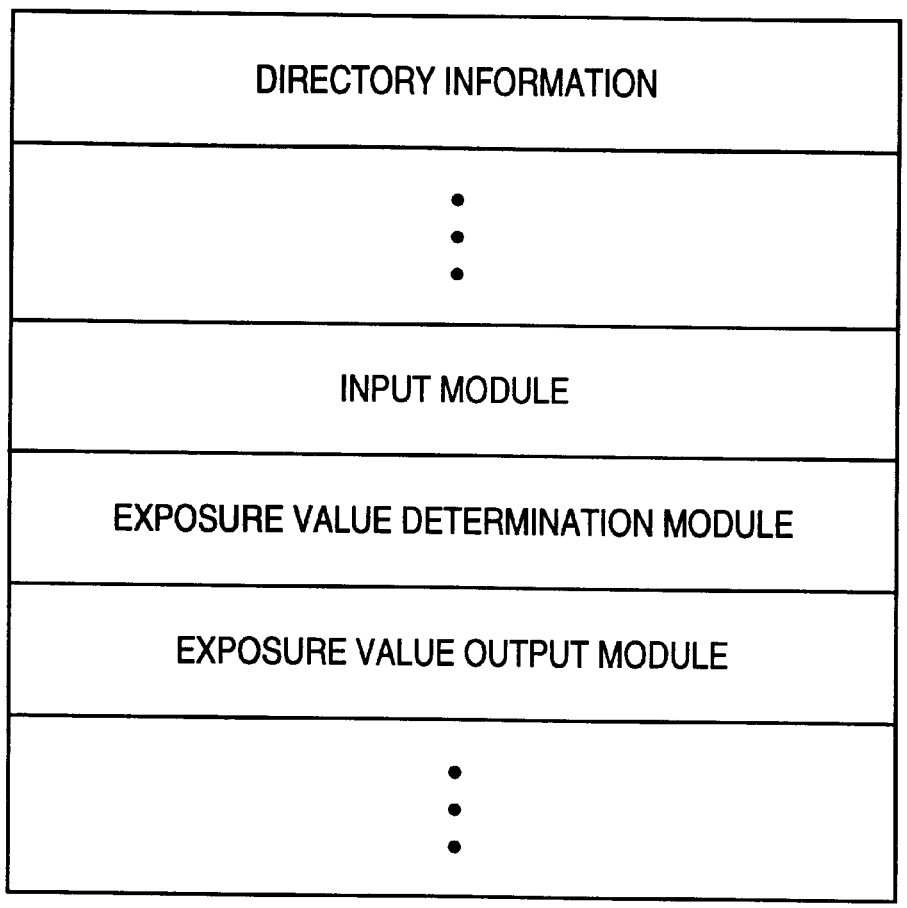
FIG. 16 is a memory map when a program module capable of realizing an operation of a computer according to the first embodiment of the present invention is stored in a storage medium.

Further, in a case where the present invention is applied to the aforesaid storage medium, the storage medium stores program codes corresponding to the flowcharts described in [Conjecturing Proper Exposure Value] in the first embodiment. Briefly, the storage medium stores each module shown as an example of a memory map in FIG. 16. More specifically, program codes which correspond to input module, exposure value determination module, and exposure value output module, at least, are to be stored in the storage medium.

The present invention is not limited to the above embodiments and various changes and modifications can be made within the spirit and scope of the present invention. Therefore to appraise the public of the scope of the present invention, the following claims are made.

What is claimed is:

1. An image sensing apparatus which provides an external device with image signals, comprising:
   a solid-state image sensing device for sensing an image and converting the image into image signals; and
   an input unit adapted to input a control signal, said control signal determined by and received from said external device, for controlling an operating rate of said solid-state image sensing device, wherein the control signal is based on an operating rate of said solid-state image sensing device and a rate at which said external device receives the image signals from said solid-state image sensing device, and
   wherein the operating rate of said solid-state image sensing device changes on the basis of the control signal input from said input unit.

2. The image sensing apparatus according to claim 1, wherein the operating rate of said solid-state image sensing device is decreased in a case where the operating rate of said solid-state image sensing devise is higher than the rate at which the external device receives the image signals from the image sensing apparatus.

3. An image sensing apparatus which provides an external device with image signals, comprising:
   a solid-state image sensing device for sensing an image and converting the image into image signals;
   an output unit adapted to output information to be used for comparing an operating rate of said solid-state image sensing device to a rate at which the external device receives the image signals from the image sensing apparatus; and
   an input unit adapted to input a control signal, determined by and received from the external device, for controlling an operating rate of said solid-state image sensing device, wherein the control signal is determined on the basis of the output information, and
   wherein the operating rate of said solid-state image sensing device changes on the basis of the control signal input from said input unit.

4. The image sensing apparatus according to claim 3, further comprising a storage unit adapted to temporarily store the image signals output from said solid-state image sensing device,
   wherein the information output by said output unit includes an occupancy status of said storage unit by the image signals.

5. The image sensing apparatus according to claim 3 further comprising a reset unit adapted to initially control the image sensing apparatus to perform image sensing operation in accordance with a control signal input from the external device.

6. The image sensing apparatus according to claim 3, wherein said output unit and said input unit are interfaces of PCMCIA standard.

7. The image sensing apparatus according to claim 3, wherein said output unit and said input unit respectively outputs and inputs signals by wireless.

8. An image sensing system including an image sensing unit and a computer, comprising:
   a solid-state image sensing device for sensing an image and converting the image into image signals;
   a communication unit adapted to communicate between the image sensing unit and the computer;
   an operating rate determination unit, provided in the computer, adapted to determine an operating rate of said solid-state image sensing device on the basis of a current operating rate of said solid-state image sensing device and a rate at which the computer receives the image signals from the image sensing unit and output a control signal for controlling the operating rate of said solid-state image sensing device in accordance with a determination result; and
   an operating rate controller, provided in the image sensing unit, adapted to control an operating rate of said solid-state image sensing device in with the control signal outputted by said operating rate determination unit.

9. The image sensing system according to claim 8 further comprising an operation unit adapted to calculate an operating rate of said solid-state image sensing device of the image sensing unit for the next image sensing operation after the computer receives a predetermined amount of the image signals; and
   a storage unit adapted to store the operating rate calculated by said operation unit.

10. The image sensing system according to claim 8 further comprising a display unit adapted to display a mark indicating that an image sensing operation is in progress during performing image sensing operation.

11. The image sensing system according to claim 8, wherein said communication unit is an interface of a PCMCIA standard.

12. The image sensing system according to claim 8, wherein said communication unit is a wireless means.

13. The image sensing system according to claim 8, further comprising a storage unit adapted to temporarily store the image signals output from said solid-state image sensing device, wherein said opening ate determination unit determines the operating rate of said solid-state image sensing device on the basis of an occupancy status of said storage unit by the image signals.

14. The image sensing system according to claim 13, wherein if the occupancy status of said storage unit indicates that the operating rate of the solid-state image sensing device is higher than the rate at which the computer receives the image signals from the image sensing unit, said operating rate determination unit determines to decrease the operating rate of sad solid-state image sensing device.

15. The image sensing system according to claim 14, wherein if the occupancy status of said storage unit is larger than a predetermined threshold, said operating rate determination unit controls to initially start an image sensing operation.

16. An image sensing apparatus which provides an external device with image signals comprising:
a solid-state image sensing device for sensing an image and converting the image into image signals; and
an input unit adapted to input a control signal, said control signal determined by and received from said external device, for controlling an operating rate of said solid-state image sensing device, wherein the control signal is based on a difference between an operating rate of said solid-state image sensing device and a rate at which said external device receives the image signals from said solid-state image sensing device, and
wherein the operating rate of said solid-state image sensing device changes on the basis of the control signal input from said input unit.

17. The image sensing apparatus according to claim 16, wherein the operation rate of said solid-state image sensing device is changed when the difference becomes equal to a greater than a predetermined value.

18. An image sensing apparatus which provides an external device with image signals comprising:
a solid-state image sensing device for sensing an image and converting the image into image signals; and
an input unit adapted to input a control signal, said control signal determined by and received from said external device, for controlling an operating rate of said solid-state image sensing device, wherein the control signal, based on a comparison result between an operating rate of said solid-state image sensing device and a rate at which said external device receives the image signals from said solid-state image sensing device, and
wherein the operating rate of said solid-state image sensing device changes on the basis of the control signal input from said input unit.

19. An image sensing apparatus which provides an external device with image signals comprising:
a solid-state image sensing device for sensing an image and converting the image into image signals; and
an input unit adapted to input a control signal, said control signal determined by and received from said external device, for controlling said image sensing apparatus, wherein the control signal is based on an operating rate of said image sensing apparatus and a rate at which said external device receives the image signals from said image sensing apparatus.

20. The image sensing apparatus according to claim 19 further comprising a controller adapted to output information to be used for comparing the opening rate of said image sensing apparatus and the rate at which the external device receives the image signals.

21. The image sensing apparatus according to claim 19 further comprising:
a memory adapted to store the image signals from said image from said solid-state image sensing device; and
a controller adapted to detect an amount of the image signals stored in said memory.

22. The image sensing apparatus according to claim 19, wherein said image sensing apparatus inputs information on white balance from said external device.

23. The image sensing according to claim 19, wherein said image sensing apparatus inputs exposure information from said external device, and said solid-state image sensing device is controlled on the basis of the exposure information.

24. The image sensing apparatus according to claim 19, wherein said image sensing apparatus sensing a moving image.

25. The image sensing apparatus according to claim 19 further comprising a signal processing circuit adapted to form luminance and chromatic signals based on the image signals from said solid-state image sensing device.

26. An image sensing system including an image sensing apparatus comprising:
said image sensing apparatus including;
a solid-state image sensing device for sensing an image and converting the image into image signals; and
an input unit adapted to input a control signal, said control signal determined by and received from an external device, for controlling said image sensing apparatus, wherein the control signal is based on an operating rate of said images sensing apparatus and a rate at which said external device receives the image signals from said image sensing apparatus, and
wherein said external device includes a control circuit which outputs said control signal.

27. The image sensing system according to claim 26 wherein said image sensing apparatus further comprises a controller adapted to output information to be used for comparing the operating rate of said image sensing apparatus and the rate at which the external device receives the image signals.

28. The image sensing system according to claim 26 wherein said image sensing apparatus further comprises:
a memory adapted to store the image signals from said image from said solid-state image sensing device; and
a controller adapted to detect an amount of the image signals stored in said memory.

29. The image sensing system according to claim 26, wherein said image sensing apparatus inputs information on white balance from said external device.

30. The image sensing system according to claim 26, wherein said image sensing apparatus inputs exposure information from said external device, and said solid-state image sensing device is controlled on the basis of the exposure information.

31. The image sensing systems according to claim 26, wherein said image sensing apparatus senses a moving image.

32. The image sensing system according to claim 26, wherein said image sensing apparatus further comprises a signal processing circuit adapted to form luminance and chromatic signal based on the image signals from solid-state image sensing device.

* * * * *

UNITED STATES PATENT AND TRADEMARK OFFICE
CERTIFICATE OF CORRECTION

PATENT NO. : 6,870,566 B1
DATED : March 22, 2005
INVENTOR(S) : Koide et al.

It is certified that error appears in the above-identified patent and that said Letters Patent is hereby corrected as shown below:

Column 7,
Line 60, delete "image," and insert therefore -- image --.

Column 18,
Line 10, delete "Therefor" and insert therefore -- Therefore --.

Column 23,
Line 1, delete "ate" and insert therefore -- rate --.
Line 11, delete "sad" and insert therefore -- said --.
Line 65, delete "opening" and insert therefore -- operating --.

Signed and Sealed this

Twenty-fifth Day of October, 2005

JON W. DUDAS
*Director of the United States Patent and Trademark Office*